(12) United States Patent
Oh et al.

(10) Patent No.: US 12,798,396 B2
(45) Date of Patent: Nov. 17, 2026

(54) TORQUE CONTROL SYSTEM AND METHOD FOR DRIVE SYSTEM OF ELECTRIC VEHICLE

(71) Applicants: HYUNDAI MOTOR COMPANY, Seoul (KR); KIA CORPORATION, Seoul (KR)

(72) Inventors: Jiwon Oh, Hwaseong-si (KR); Jeong Soo Eo, Hwaseong-si (KR); Ho Wook Lee, Hwaseong-si (KR); Tae Woo Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/052,734

(22) Filed: Feb. 13, 2025

(65) Prior Publication Data

US 2026/0103088 A1 Apr. 16, 2026

(30) Foreign Application Priority Data

Oct. 11, 2024 (KR) ........................ 10-2024-0138339

(51) Int. Cl.
*B60L 15/00* (2006.01)
*B60L 15/20* (2006.01)

(52) U.S. Cl.
CPC ....... *B60L 15/2036* (2013.01); *B60L 2240/12* (2013.01); *B60L 2240/421* (2013.01); *B60L 2250/28* (2013.01); *B60L 2260/28* (2013.01)

(58) Field of Classification Search
USPC ........................................................... 701/22
See application file for complete search history.

(56) References Cited

U.S. PATENT DOCUMENTS 8,892,281 B2 * 11/2014 Suzuki .................... B60L 15/20 318/432
2007/0225888 A1 * 9/2007 Morris .................. B60K 6/547 701/22

(Continued)

FOREIGN PATENT DOCUMENTS

KR 10-1448746 B1 10/2014
KR 10-1704243 B1 2/2017
KR 2022-0096746 A 7/2022

*Primary Examiner* — Jonathan M Dager
(74) *Attorney, Agent, or Firm* — MCDONNELL BOEHNEN HULBERT & BERGHOFF LLP

(57) ABSTRACT

A torque control system for a drive system of an electric vehicle includes a controller that generates a front-wheel torque command and a rear-wheel torque command having torque values distributed from required torque for vehicle driving, according to a torque distribution mode selected based on vehicle driving information among plural torque distribution modes, a front-wheel motor and a rear-wheel motor controlled according to the torque commands output by the controller. The controller determines whether switching between the plural torque distribution modes occurs, calculates, during the mode switching, a torque correction amount for reducing backlash shock based on a backlash estimation value in the drive system of a torque command that causes zero-crossing among the front- and rear-wheel torque commands, and performs torque correction using the calculated torque correction amount for the other torque command that does not cause zero-crossing.

13 Claims, 8 Drawing Sheets

(56) References Cited

U.S. PATENT DOCUMENTS

| | | | | |
|---|---|---|---|---|
| 2007/0225889 | A1* | 9/2007 | Morris | B60W 10/06<br>701/53 |
| 2009/0237026 | A1* | 9/2009 | Panaitescu | G05B 19/404<br>318/630 |
| 2010/0114424 | A1* | 5/2010 | Morris | F16H 59/68<br>701/51 |
| 2013/0297110 | A1* | 11/2013 | Nefcy | B60L 15/20<br>701/22 |
| 2018/0312078 | A1* | 11/2018 | Message | B60L 15/2063 |
| 2020/0070836 | A1* | 3/2020 | Suzuki | B60L 15/20 |
| 2020/0231048 | A1* | 7/2020 | Gauthier | B60L 15/34 |
| 2020/0391598 | A1* | 12/2020 | Lee | H02P 6/08 |
| 2021/0023944 | A1* | 1/2021 | Ravichandran | B60K 23/0808 |
| 2021/0053487 | A1* | 2/2021 | Vangelov | B60G 17/018 |
| 2022/0153144 | A1* | 5/2022 | Oh | B60L 50/10 |
| 2023/0226924 | A1* | 7/2023 | Lee | H02P 29/0016<br>701/22 |
| 2024/0317050 | A1* | 9/2024 | Oh | B60K 23/0808 |
| 2024/0317067 | A1* | 9/2024 | Oh | B60K 23/0808 |
| 2024/0317068 | A1* | 9/2024 | Oh | B60L 15/20 |
| 2024/0391326 | A1* | 11/2024 | Oh | B60L 3/06 |
| 2024/0399885 | A1* | 12/2024 | Oh | B60L 3/06 |
| 2025/0018805 | A1* | 1/2025 | Oh | B60K 1/02 |
| 2025/0108701 | A1* | 4/2025 | Ståhl | B60L 15/32 |

* cited by examiner

TORQUE CONTROL SYSTEM AND METHOD FOR DRIVE SYSTEM OF ELECTRIC VEHICLE

CROSS REFERENCE TO RELATED APPLICATIONS

This application claims, under 35 U.S.C. § 119(a), the benefit of priority to Korean Patent Application No. 10-2024-0138339 filed on Oct. 11, 2024, the entire contents of which are incorporated herein by reference.

BACKGROUND

(a) Technical Field

The present disclosure relates to a torque control method for a drive system of an electric vehicle, and more specifically, to a torque control system for the drive system capable of alleviating backlash of the drive system in the electric vehicle, reducing backlash vibration, and improving drivability of the vehicle, and a method therefor.

(b) Background Art

Generally, a vehicle's drive system must generate appropriate torque according to a driver's driving input value, such as an accelerator position sensor value or a brake position sensor value, or a torque command determined by a request of an advanced driver assistance system (ADAS).

Here, in a case where a torque change rate (that is, a torque gradient) is set too large, problems such as drive shaft twist, gear backlash shock, or drivability deterioration due to rapid torque change may occur.

Conversely, in a case where the torque change rate is set too small, it takes additional time to provide torque requested by a driver or an ADAS controller, and an actual vehicle behavior may differ from a driver's intention, thereby causing frustrating responsiveness or dangerous situations.

In this way, it can be said that there is a conflict between the degree of reduction of NVH (Noise, Vibration, and Harshness) and the degree of securing the vehicle's acceleration and deceleration responsiveness due to rapid torque change in the vehicle.

In this regard, in mass-produced vehicles, gradient limits and filters that use various conditions as factors have been used to generate an optimal drive system torque command capable of solving the above-mentioned conflict.

In addition, active feedback torque correction control capable of suppressing vibration that has already been generated using the motor may be employed in an electrified vehicle that uses a motor as a drive source or a part thereof.

However, no matter how advanced backlash post-correction control is, it is difficult to suppress the problem of reduced vehicle responsiveness, which is inevitably caused by characteristics of hardware. Moreover, NVH issues due to backlash frequently occur in an electric vehicle with few vibration damping elements in a drive system.

As a related art document, Korean Patent No. 10-1704243 (Feb. 1, 2017) discloses a method of generating a model speed of a drive shaft using a disturbance observer and reducing vibration using a difference between the model speed of the drive shaft and an actual speed. This patent document also discloses a method of calculating the model speed based on a wheel speed instead of the disturbance observer in determining the model speed.

In addition, Korean Patent No. 10-1448746 (Oct. 1, 2014) discloses a method of generating a model speed of a motor using an input torque model and reducing vibration using a difference between the model speed of the motor and an actual speed (measured speed).

In addition, Korean Patent Publication No. 10-2022-0096746 (Jul. 7, 2022) discloses a method of estimating a speed of a drive system using a torque model and determining a gradient of a torque command using a difference between an actual speed of the drive system and the estimated speed.

However, all of the above-mentioned related art merely discloses a torque post-correction method for reducing and suppressing vibration generated in the drive system, and does not disclose a torque distribution method and a torque correction method based thereon capable of suppressing or preventing vibration.

The above information disclosed in this Background section is only for enhancement of understanding of the background of the disclosure and therefore it may contain information that does not form the prior art that is already known in this country to those skilled in the art.

SUMMARY

Accordingly, the present disclosure has been made in an effort to solve the above-described problems associated with prior art, and an object of the present disclosure is to provide a torque control system for a drive system of an electric vehicle, capable of alleviating backlash of the drive system, reducing backlash vibration, and improving drivability of the vehicle, and a method therefor.

The present disclosure is not limited to the objects mentioned above, and other objects not clearly mentioned may be understood by those who skilled in the art from the description below.

In one aspect, the present disclosure provides a torque control system for a drive system of an electric vehicle including a controller that generates a front-wheel torque command and a rear-wheel torque command having torque values distributed from required torque for vehicle driving, according to a torque distribution mode selected based on vehicle driving information among a plurality of set torque distribution modes, a front-wheel motor whose operation is controlled according to the front-wheel torque command generated and output by the controller, and a rear-wheel motor whose operation is controlled according to the rear-wheel torque command generated and output by the controller, in which the controller determines whether switching between the plurality of torque distribution modes occurs, calculates, during the switching between the torque distribution modes, a torque correction amount for reducing backlash shock based on a backlash estimation value in the drive system of a torque command that causes zero-crossing among the front-wheel torque command and the rear-wheel torque command, and performs torque correction using the calculated torque correction amount for the other torque command that does not cause the zero-crossing.

In another embodiment, the plurality of torque distribution modes may include a same-direction distribution mode in which the distributed front-wheel torque command and rear-wheel torque command are determined as torque values in the same direction among a motor regeneration direction and a motor driving direction, and a reverse-direction distribution mode in which the distributed front-wheel torque command and rear-wheel torque command are determined as torque values in different directions among the motor regeneration direction and the motor driving direction.

In another embodiment, the controller may select a torque distribution mode corresponding to a current vehicle driving state based on an accelerator operation state, a brake operation state, and the required torque, as the vehicle driving information, among the plurality of torque distribution modes.

In still another embodiment, the backlash estimation value may correspond to one or both of a backlash speed estimation value of the drive system at which the torque command causes the zero-crossing and a backlash acceleration estimation value of the drive system at which the torque command causes the zero-crossing.

In yet another embodiment, the controller may determine the torque correction amount as a value obtained by selectively applying one or more of a weight, a filter, a change rate limit, and a dead zone to the backlash estimation value.

In yet still another embodiment, the controller may adjust the weight, a time constant or gain of the filter, a change rate limit value for the change rate limit, and the dead zone applied to the backlash estimation value according to at least one of the required torque, a current torque estimation value, an accelerator position sensor value, a vehicle speed, or a motor speed.

In another aspect, the present disclosure provides a torque control method for a drive system of an electric vehicle including determining a front-wheel torque command and a rear-wheel torque command having torque values distributed from required torque for vehicle driving, according to a torque distribution mode selected based on vehicle driving information among a plurality of set torque distribution modes, by a controller, determining whether switching between the plurality of torque distribution modes occurs, determining, during the switching between the torque distribution modes, a backlash estimation value for the drive system of a torque command that causes zero-crossing among the front-wheel torque command and the rear-wheel torque command, by the controller, calculating a torque correction amount for reducing backlash shock based on the determined backlash estimation value, by the controller, and performing torque correction using the calculated torque correction amount for the other torque command that does not cause the zero-crossing among the front-wheel torque command and rear-wheel torque command, by the controller.

Other aspects and preferred embodiments of the disclosure are discussed infra.

It is to be understood that the term “vehicle” or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered by both electricity and gasoline.

BRIEF DESCRIPTION OF THE FIGURES

The above and other features of the present disclosure will be described in detail with reference to certain exemplary embodiments thereof illustrated the accompanying drawings which are given hereinafter by way of illustration only, and thus are not limitative of the present disclosure, and wherein.

Figure 1:
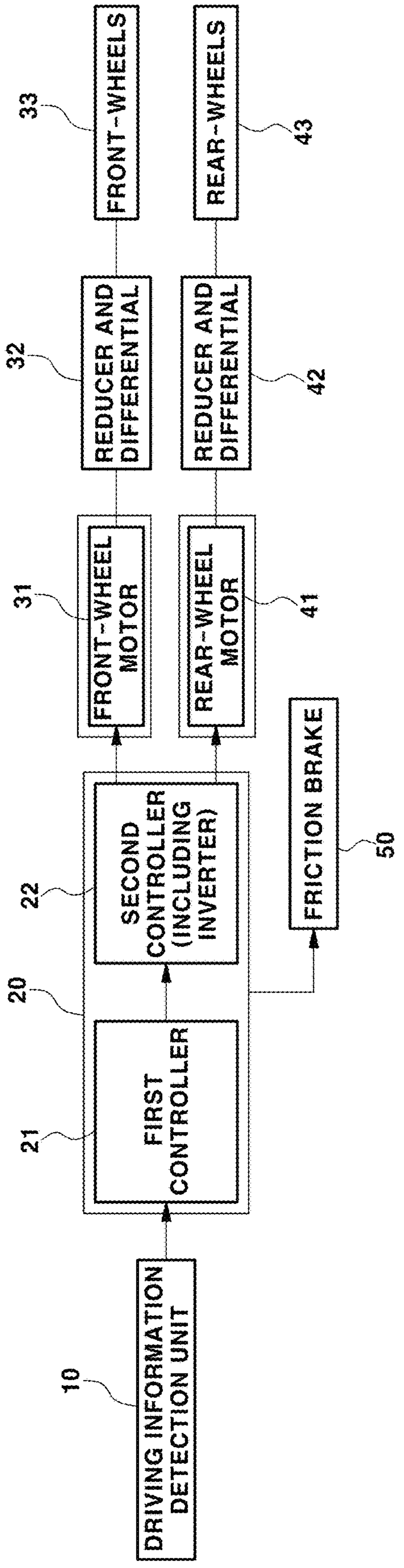
FIG. 1 is a block diagram showing a configuration of a torque control system that performs a torque control process for a drive system according to an embodiment of a present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, within the spirit and scope of the disclosure as defined by the appended claims.

It will be understood that, although the terms “first”, “second”, etc. may be used herein to describe various elements, these elements should not be limited by these terms. These terms are only used to distinguish one element from another. For example, a first element may be termed a second element, and, similarly, a second element may be termed a first element, without departing from the scope of the exemplary embodiments of the present disclosure.

In addition, it will be understood that, when an element is “connected” or “coupled” to another element, it may be directly connected or coupled to the other element, or may be indirectly connected or coupled to the other element with a different element being interposed therebetween. In contrast, when an element is “directly connected” or “directly coupled” to another element, this means that there is no intervening element therebetween. Other expressions used to describe the relationship between elements should be interpreted in a similar manner (for example, "between" and "directly between", "adjacent" and "directly adjacent", etc.).

Wherever possible, the same reference numbers will be used throughout the drawings to refer to the same or like parts. The terminology used herein is for the purpose of describing particular embodiments only and is not intended to limit exemplary embodiments of the disclosure. As used herein, the singular forms "a", "an", and "the" are intended to include the plural forms as well, unless the context clearly indicates otherwise. It will be further understood that the terms "comprise", "include", and "have" used herein specify the presence of stated components, steps, operations, and/or elements, but do not preclude the presence or addition of one or more other components, steps, operations, and/or elements.

The present disclosure provides a method of generating a motor torque command and controlling a drive system torque, capable of minimizing the influence of a backlash of a drive system on drivability in an electric vehicle having two or more individual drive motors.

To this end, the torque control method for the drive system according to the present disclosure includes a reverse-direction torque distribution method between front and rear-wheels, capable of generating drive system torque while avoiding a backlash band so as to prevent a backlash from occurring in the drive system in advance, rather than a method of alleviating problems caused by the backlash of the drive system.

In the present disclosure, in order to avoid the backlash band, which is a torque band in which a backlash may occur in a drive system in generating torque during vehicle driving, driving torque bands of front and rear motors are separated using the reverse-direction torque distribution method between the front and rear-wheels.

Accordingly, as a torque control mode of the drive system of the electric vehicle according to the present disclosure, a torque distribution mode further includes a reverse-direction distribution mode in which torque in reverse-directions is distributed to the front and rear-wheels, in addition to a typical same-direction distribution mode in which torque in the same direction is distributed to the front and rear-wheels.

Further, the torque control method for the drive system of the electric vehicle according to the present disclosure includes a control method of performing switching between the same-direction distribution mode and the reverse-direction distribution mode, i.e., distribution mode switching.

In the present description, the backlash band may be defined as a torque band in which a backlash may occur in the drive system of the vehicle. The drive system of the vehicle includes a drive unit that drives a vehicle, drive wheels, and drive elements such as a drive shaft, a reducer, a differential, and an axle between the drive unit and the drive wheels.

Since problems due to the backlash in the drive system of the vehicle mainly occur only in a torque band close to 0, it can be said that the torque band close to 0 may be the backlash band where the backlash problems may occur.

In the present disclosure, the backlash band may include a backlash band of the front-wheel drive system, which is a torque band where the backlash may occur in the front-wheel drive system, and a backlash band of the rear-wheel drive system, which is a torque band where the backlash may occur in the rear-wheel drive system.

In the present disclosure, the backlash band of the front-wheel drive system and the backlash band of the rear-wheel drive system may be respectively set to a torque range having a lower limit threshold, which is a negative (−) value, and an upper limit threshold, which is a positive (+) value.

That is, the backlash band may be set to a torque range including 0, and a backlash state may occur in a case where an input torque applied to the drive system by the motor, which is a drive unit, enters the set backlash band.

Here, the backlash refers to a gap that exists between engaged teeth of two gears. Between the two engaged gears, backlash may cause vibration or noise as the gear teeth strike each other, and in the worst case, the backlash may cause damage to the gears.

In a case where torque is continuously applied in a specific direction, since one of the two engaged gears continues to transmit power in the same direction as the other, the teeth of the two engaged gears remain aligned and engaged in the specific direction, and thus, the backlash problems do not occur.

However, in a case where the direction of the torque changes, the power transmitting direction changes, and the gear teeth are aligned in a reverse-direction after experiencing the backlash. Here, after the alignment in the reverse-direction is achieved, since the engagement of the gears is not released again while transmitting power in the same direction, the backlash problems do not occur.

However, at the moment when the power transmitting direction changes again, since the engagement between the gears is released and then achieved again after passing through the backlash gap, the backlash problems occur.

Therefore, the key to avoiding the backlash problems is to eliminate or minimize a situation in which the gear engagement is released, which may be achieved by eliminating or minimizing a direction change of a torque command to each drive unit such as a motor.

In order to eliminate or minimize the direction change of the torque command, a method of allowing the front and rear-wheel drive units for driving the vehicle, i.e. the front-wheel motor and the rear-wheel motor, to share their roles, and for this purpose, dividing torque operating areas for the front-wheel motor and the rear-wheel motor may be considered.

However, when applying this control, the maximum acceleration performance may be limited. In order to overcome this limitation, it is necessary to switch the drive system torque control mode (i.e., torque distribution mode). The present disclosure proposes an effective distribution mode switching method.

In the following description, the torque includes both torque that is input to the drive system by the drive unit and transmitted to the drive wheels, and torque that is transmitted to the drive unit from the drive wheels through the drive system.

Further, in the following description, the torque includes both driving torque for accelerating the vehicle and braking torque for decelerating the vehicle. Here, the braking torque includes regenerative braking torque by a motor and friction braking torque by a friction brake.

Unless otherwise specified in this specification as the driving torque and the braking torque, depending on driving situations of the vehicle, the torque may be the driving torque for accelerating the vehicle (acceleration situation) or the braking torque for decelerating the vehicle (deceleration situation). The motor torque for decelerating the vehicle is the regenerative braking torque.

Hereinafter, the torque control system and torque control method for the drive system of the electric vehicle according to the present disclosure will be described in detail.

FIG. 1 is a block diagram showing a configuration of a device that performs a drive system torque control process according to the present disclosure.

The present disclosure may be applied to a vehicle in which front-wheels 33 and rear-wheels 43 are driven by independent drive units, respectively. Specifically, the present disclosure may be applied to a vehicle equipped with a front-wheel drive unit that applies torque to the front-wheels 33 and a rear-wheel drive unit that applies torque to the rear-wheels 43. Here, the front-wheels 33 and the rear-wheels 43 are both driving wheels connected to the drive units for power transmission.

In addition, the present disclosure may be applied to a vehicle in which both the front-wheel drive unit and the rear-wheel drive unit are motors. In the following description, a motor 31 that is a front-wheel drive unit is referred to as a "front-wheel motor", and a motor 41 that is a rear-wheel drive unit is referred to as a "rear-wheel motor".

Referring to FIG. 1, the front-wheel motor 31 is connected to the front-wheels 33 for power transmission through a reducer and differential 32, and the rear motor 41 is connected to the rear-wheels 43 for power transmission through a reducer and differential 42.

In the following description, a front-wheel torque command and a rear-wheel torque command are torque (front axle torque and rear axle torque) commands for respective axles, which refer to torque commands for the respective motors 31 and 41 that drive the vehicle, that is, a front-wheel motor torque command that is a torque command for the front-wheel motor 31 and a rear-wheel motor torque command that is a torque command for the rear-wheel motor 41, respectively.

Here, among the motor torques, torque in a vehicle acceleration direction and torque in a motor driving direction are defined as positive (+) direction torque, that is, torque with a positive (+) value. In addition, among the motor torques, torque in a vehicle deceleration direction and torque in a motor regenerative direction are defined as negative (−) direction torque, that is, torque with a negative (−) value.

In a case where the torque values of the front-wheel torque command and rear-wheel torque command are positive (+) values, the commands are driving torque commands for the relevant motors, and in a case where the torque values of the front-wheel torque command and rear-wheel torque command are negative (−) values, the commands are regenerative braking torque commands for the relevant motors. The torque value of each command becomes the magnitude of the torque to be generated by the relevant motor according to the command.

In the present disclosure, the drive system of the vehicle includes a front-wheel drive system and a rear-wheel drive system. Each of the front-wheel drive system and the rear-wheel drive system includes the motor that drives the vehicle, the drive wheels, and drive elements such as a drive shaft, the reducer and differential, and an axle between the motor and the drive wheels.

That is, the front-wheel drive system includes the front-wheel motor 31, the front-wheels 33, a drive shaft (not shown), and the reducer and differential 32, and an axle (not shown) between the front-wheel motor 31 and the front-wheels 33, and the rear-wheel drive system includes the rear-wheel motor 41, the rear-wheels 43, and a drive shaft (not shown), the reducer and differential 42, and the axle (not shown) between the rear motor 41 and the rear-wheels 43.

In each drive system, torque output from the front-wheel motor 31 and the rear-wheel motor 41 may be transmitted to the front-wheels 33 and the rear-wheels 43 through the drive elements such as the drive shaft, the reducer and differentials 32 and 42, and the axle.

In addition, although not shown in FIG. 1, a battery is connected to the front-wheel motor 31 and the rear-wheel motor 41 via an inverter to enable charging and discharging. The inverter may include a front-wheel inverter (not shown) for driving and controlling the front-wheel motor 31 and a rear-wheel inverter (not shown) for driving and controlling the rear-wheel motor 41.

In an electric vehicle, operations (driving and regenerative braking) of the front-wheel motor 31 and the rear-wheel motor 41 are controlled according to torque commands generated by a controller 20. The controller 20 determines required torque for driving the vehicle based on vehicle driving information obtained by a driving information detection unit 10 or the like, and determines front-wheel torque and rear-wheel torque distributed to the front and rear wheels from the required torque.

Then, the controller 20 uses the determined front-wheel torque and rear-wheel torque as command values to generate and output torque commands for the respective motors, that is, a front-wheel torque command and a rear-wheel torque command, which are torque commands for the respective motors to generate the front-wheel torque and the rear-wheel torque.

Further, the controller 20 controls the operations of the front-wheel motor 31 and the rear-wheel motor 41 through an inverter based on the front-wheel torque command and the rear-wheel torque command. As described above, in a case where the torque values of the front-wheel torque command and the rear-wheel torque command are the positive (+) direction torque (positive value torque), they may be defined as driving torque commands, which are torque commands in the vehicle acceleration direction and the driving direction, and in a case where the torque values of the front-wheel torque command and the rear-wheel torque command are the negative (−) direction torque (negative value torque), they may be defined as regenerative braking torque commands, which are torque commands in the vehicle deceleration direction and the regenerative direction.

In the present embodiment, the controller 20 may include a first controller 21 that determines the demand torque necessary for vehicle driving based on the vehicle driving information detected by the driving information detection unit 10, such as driver's driving input values, or receives the demand torque from other devices such as an ADAS (Advanced Driver Assistance System) controller, and generates and outputs the front-wheel torque command and the rear-wheel torque command, which are torque commands for the respective motors (respective axles), based on the demand torque, and a second controller 22 that controls the operations of the front-wheel motor 31 and the rear-wheel motor 41 according to the front- and rear-wheel torque commands output by the first controller 21.

The first controller 21 may be a vehicle control unit (VCU) that determines and generates torque commands necessary for vehicle driving in a typical vehicle. Since methods and processes of determining the demand torque necessary for vehicle driving from the vehicle driving information and determining the torque command for controlling the torque of the drive system including the motor are well-known in the relevant technical field, detailed description thereof will be omitted.

In a case where the front-wheel torque command and the rear-wheel torque command are output from the first controller 21, the second controller 22 receives the same and controls the operations of the front-wheel motor 31 and the rear-wheel motor 41 through the front-wheel inverter and the rear-wheel inverter.

As a result, torque output by the front-wheel motor 31 is applied to the front-wheels 33 through the reducer and differential 32 of the front-wheel drive system, and torque output by the rear-wheel motor 41 is applied to the rear-wheels 43 through the reducer and differential 42 of the rear-wheel drive system.

The second controller 22 may be a typical motor control unit (MCU) that controls an operation of a drive motor through an inverter according to a torque command output from the vehicle control unit (VCU) in the electric vehicle.

In the present embodiment, the vehicle driving information input to the controller 20, indicating vehicle driving states such as driver's driving input values, may include sensor detection information that is detected by the driving information detection unit 10 and is input to the controller 20 through a vehicle network.

Here, the driving information detection unit 10 may include an accelerator position sensor (APS) that detects a driver's accelerator position sensor value (APS value, %), a speed sensor that detects a drive system speed, and a sensor that detects a vehicle speed.

Here, the drive system speed may be a rotational speed of a drive element that is present on a power transmission path from the front-wheel motor 31 or the rear-wheel motor 41 to the corresponding wheels 33 and 43 in the front-wheel drive system or rear-wheel drive system.

For example, the drive system speed may be a rotational speed of the front-wheel motor 31 or the rear-wheel motor 41, which is the drive motor, or a rotational speed (wheel speed) of the driving wheels 33 or 43. The speed sensor that detects the drive system speed (drive system speed measurement value to be described later) may be a sensor that detects the rotational speed of each of the motors 31 and 41, and may be a normal resolver that detects a rotor position of the motor. Alternatively, the speed sensor may be a typical wheel speed sensor that detects rotational speeds (wheel speeds) of the driving wheels 33 and 43.

Further, the sensor that detects the vehicle speed may also be the wheel speed sensor. Since a method of obtaining vehicle speed information from a signal of the wheel speed sensor is well-known in the art, a detailed description thereof will be omitted.

As the vehicle driving information for determining and generating the required torque and the torque command in the controller 21, a driver's accelerator position sensor value (APS value, %), rotational speeds of the motor 31 and 41, rotational speeds of the drive wheels 33 and 43, a vehicle speed, and the like, which is detected by the driving information detection unit 10, may be selectively used.

Here, in a broad sense, the vehicle driving information may include information determined by the controller 20 itself, and furthermore, may include information (for example, required torque information) input to the controller 20 from another controller (for example, ADAS controller) in the vehicle through the vehicle network.

In FIG. 1, reference numeral "50" indicates a friction brake of the vehicle, which may be a typical hydraulic brake. The friction brake 50 may be a front-wheel friction brake that applies friction braking torque to the front-wheels 31 or a rear-wheel friction brake that applies friction braking torque to the rear-wheels 43.

In the above description, the control subject is divided into the first controller 21 and the second controller 22, but the torque control process according to the present disclosure may be performed by a single integrated control element instead of the above-described plurality of controllers.

In this specification, the plurality of controllers 21 and 22 and the single integrated control element may be collectively referred to as the controller 20, and the torque control process according to the present disclosure may be performed by the controller 20. In the following description, the controller 20 collectively refers to the first controller 21 and the second controller 22 shown in FIG. 1.

Hereinbefore, the configuration of the system that performs the drive system torque control process according to the present disclosure has been described. Hereinafter, the drive system torque control process performed by the above-described system will be described in detail.

In an embodiment of the present disclosure, the controller 20 determines required torque for vehicle driving from real-time vehicle driving information detected by the driving information detection unit 10, and then performs front-wheel and rear-wheel torque distribution for following the determined required torque.

In the front-wheel and rear-wheel torque distribution process, the controller 20 determines the front-wheel torque command and the rear-wheel torque command so that a torque sum of the front-wheel torque command and the rear-wheel torque command (a sum of distributed front-wheel and rear-wheel torque values) is a value for following the required torque.

The controller 20 may distribute required torque received from another controller such as an ADAS controller, instead of the required torque determined by the controller 20 from the vehicle driving information, into front-wheel torque and rear-wheel torque.

Since a method of determining the required torque from the vehicle driving information indicating the driver's driving input value such as an accelerator position sensor value or brake position sensor value, and the vehicle speed is well known, a detailed description thereof will be omitted.

In a case where the driver tips in an accelerator or tips out the accelerator in the tip-in state, the required torque may switch from vehicle deceleration direction torque to vehicle acceleration direction torque, or vice versa. In the present disclosure, the required torque includes both the vehicle acceleration direction torque and the vehicle deceleration direction torque.

In the case of the same-direction distribution mode in the present disclosure, when the direction of the required torque is reversed, the directions of the front-wheel torque and the rear-wheel torque may also be reversed. That is, in the same-direction distribution mode, in a case where there is a zero-crossing request of the required torque, the controller 20 changes the directions of both the front-wheel torque (command) and the rear-wheel torque (command) to follow the required torque.

On the other hand, in the reverse-direction distribution mode, even in a case where the direction of the required torque is reversed, the directions of the front-wheel torque and the rear-wheel torque do not change, and the sum of the front-wheel torque and the rear-wheel torque follows the required torque. Here, the front-wheel torque is always determined as a negative (−) direction torque, and the rear-wheel torque is always determined as a positive (+) direction torque.

The drive system torque control mode according to the present disclosure will be more specifically described. Here, the reverse-direction distribution mode is a mode for generating a torque command while evading a backlash band in which backlash of a drive system may occur. Here, the evasion of the backlash band means preventing, as much as possible, a situation in which the torque command enters and evades the backlash band.

This may be achieved by making the front-wheel torque and front-wheel torque command only maintain negative (−) torque values, and the rear-wheel torque and rear-wheel torque command only maintain positive (+) torque values. This is because the backlash issues are caused when the torque direction changes, as mentioned above.

When applying the above-mentioned control strategy, the gears are continuously aligned in a positive (+) torque transmission direction to avoid entering the backlash band in the rear-wheel drive system, which may be achieved by continuously generating at least a small amount of positive (+) torque in the rear-wheel drive system.

In the present disclosure, the small amount of positive (+) torque for continuously aligning the gears in the positive (+) torque transmission direction is defined as a rear-wheel minimum torque threshold (positive value), and during the reverse-direction distribution mode, which is a mode in which the backlash band evasion control is performed, the value of the rear-wheel torque command (positive value) is determined in a region equal to or greater than the preset rear-wheel minimum torque threshold.

Similarly, the gears are continuously aligned in a negative (−) torque transmission direction to avoid entering the backlash band in the front-wheel drive system, which may be achieved by continuously generating at least a small amount of negative (−) torque in the front-wheel drive system.

Here, the small amount of negative (−) torque for continuously aligning the gears in the negative (−) torque transmission direction is defined as a front-wheel maximum torque threshold (negative value), and during the reverse-direction distribution mode, which is a mode in which the backlash band evasion control is performed, the value of the front-wheel torque command (negative value) is determined in a region equal to or smaller than the preset front-wheel maximum torque threshold. In other words, the absolute value of the front-wheel torque command is determined to be a value equal to or greater than the front-wheel maximum torque threshold.

In the present disclosure, the rear-wheel minimum torque threshold may be set in the controller 20 as a torque value outside the backlash band, which is a torque band in which the backlash may occur in the rear-wheel drive system. In other words, the rear-wheel minimum torque threshold may be set to a value greater than an upper limit threshold of the backlash band of the rear-wheel drive system.

Similarly, the front-wheel maximum torque threshold may be set in the controller 20 as a torque value outside the backlash band, which is a torque band in which the backlash may occur in the front-wheel drive system. Here, the front-wheel maximum torque threshold may be set as a value smaller than a lower limit threshold of the backlash band of the front-wheel drive system.

However, a problem that may occur with this method is that, since only one of the front axle motor or the rear axle motor is used for acceleration and regenerative braking (deceleration), maximum generated power may be insufficient compared to when both the axle motors are used for all purposes.

That is, since only one of the front-wheel motor 31 and the rear-wheel motor 41 is used, maximum generated output may be insufficient compared to a case where both the front-wheel motor 31 and the rear-wheel motor 41 are used for acceleration or for regenerative braking. This may make it difficult to achieve maximum acceleration performance or maximum regenerative braking.

However, in general, since during acceleration, the load transfer is basically concentrated on the rear-wheel side and the driving torque of the rear axle plays a main role, and conversely, during deceleration, the load transfer is concentrated on the front-wheel side and the regenerative braking torque of the front axle plays a main role, the backlash band evasion strategy proposed in the present disclosure does not cause significant performance degradation.

However, since the maximum performance when both the motors are used together cannot be achieved when only one motor is used, the following countermeasures may be considered.

First, the reverse-direction distribution mode is set in the controller 20, and the reverse-direction distribution mode may be selectively performed by the controller 20. The reverse-direction distribution mode may be a responsiveness priority mode in which vehicle acceleration/deceleration responsiveness is prioritized, and may be a backlash band avoidance mode in which the backlash band avoidance control is performed. In the reverse-direction distribution mode, reverse torque distribution control for distributing torque commands in opposite directions to the front and rear-wheels and applying torque in opposite directions is performed.

Unlike the reverse-direction distribution mode, the same-direction distribution mode capable of generating maximum output is set in the controller 20. The same-direction distribution mode may be a conventional drive system torque control mode applied to a normal vehicle. In the same-direction distribution mode, a torque command in the same direction is distributed to the front and rear-wheels, and torque in the same direction is applied during vehicle acceleration and regeneration.

Accordingly, in the present disclosure, the torque distribution to the front and rear-wheels may be either the same-direction distribution or the reverse-direction distribution. In the same-direction distribution, the front motor and the rear motor are controlled to generate torque in the same direction (both positive (+) torque or both negative (−) torque). Here, since the front motor and the rear motor generate torque in the same direction, the front-wheel torque and the rear-wheel torque are added to generate maximum torque.

However, in the same-direction distribution, as the required torque passes 0 (zero-crossing) and the direction and sign ("+" or "−") of the required torque is reversed, the torque directions of the front-wheel torque command and the rear-wheel torque command must also be reversed.

Accordingly, the front-wheel torque command and the rear-wheel torque command cause zero-crossing while passing through the backlash band, and a change rate (gradient) of the front-wheel torque command and the rear-wheel torque command is limited while passing through the backlash band. Due to such control characteristics when passing through the backlash band, the vehicle acceleration/deceleration response is delayed.

On the other hand, in the reverse-direction distribution, even in a case where there is a change in the direction of the required torque, the front and rear motors always generate torque in different directions. That is, the front torque command for controlling the operation of the front-wheel motor 31 is determined and generated as a negative (−)

torque value, and the rear torque command for controlling the operation of the rear-wheel motor 41 is determined and generated as a positive (+) torque value.

Accordingly, the rear-wheel motor mainly generates driving torque for vehicle acceleration, and the front-wheel motor mainly generates regenerative braking torque for vehicle deceleration (regenerative braking).

In the reverse-direction distribution, since the torque command does not need to pass through the backlash band and there is no need to limit the change rate (gradient) of the torque command in the backlash band, vehicle acceleration/deceleration responsiveness may be improved.

In the reverse-direction distribution mode according to the present disclosure, in a case where the required torque is in the positive (+) direction, a driving torque for vehicle acceleration must be generated, and thus, the reverse-direction torque distribution control in the acceleration direction is performed. Here, the torque command for the front-wheel motor 31, i.e., the front-wheel torque command, is determined as a torque command in the negative (−) direction.

In particular, an absolute value of the front-wheel torque command is determined as a minimum value capable of maintaining the gear teeth aligned so that the backlash does not occur in the front-wheel drive system. Here, the minimum value is the front-wheel maximum torque threshold. In the embodiment of the present disclosure, the front-wheel maximum torque threshold may be a value that varies in real time depending on states of the drive system.

At the same time, the torque command for the rear-wheel motor 41, i.e., the rear-wheel torque command, may be determined as a torque command in the positive (+) direction, and the rear-wheel torque command may be determined as a value obtained by subtracting the front-wheel torque command from a total torque command (required torque which is torque before distribution).

In a case where the required torque is in the negative (−) direction, regenerative braking torque must be generated to decelerate the vehicle, and thus, the reverse torque distribution control in the regenerative direction is performed. Here, the rear-wheel torque command is determined as a torque command in the positive (+) direction.

In particular, the magnitude of the rear-wheel torque command is determined as a minimum value capable of maintaining the gear teeth aligned so that the backlash does not occur in the rear-wheel drive system. Here, the minimum value is the rear-wheel minimum torque threshold. In the embodiment of the present disclosure, the rear-wheel maximum torque threshold may be a value that varies in real time depending on states of the drive system.

At the same time, the torque command for the front-wheel motor 41 may be determined as a torque command in the positive (+) direction, and the front-wheel torque command may be determined as a value obtained by subtracting the rear-wheel torque command from the total torque command (required torque which is torque before distribution).

The states of the drive system for determining the front-wheel maximum torque threshold and the rear-wheel minimum torque threshold may include input torque applied to the drive system by the front-wheel motor 31 or the rear-wheel motor 41.

The input torque may be one of a total torque command, a motor torque estimation value estimated by a motor controller, a motor torque detection value detected by a torque sensor, a value obtained by applying a filter to the total torque command, a value obtained by applying a filter to the motor torque estimation value, and a value obtained by applying a filter to the motor torque detection value.

Alternatively, the input torque may be a front-wheel torque command and a rear-wheel torque command determined by a normal front and rear-wheel torque distribution process of distributing the total torque command according to a front and rear-wheel distribution ratio. Here, the front-wheel maximum torque threshold may be variably determined as a value corresponding to the distributed front-wheel torque command, and the rear-wheel minimum torque threshold may be variably determined as a value corresponding to the distributed rear-wheel torque command.

According to the above-mentioned reverse-direction distribution mode, it is not possible to generate a maximum driving force or maximum regenerative braking force by the motor, but relatively immediate acceleration/deceleration responsiveness in all situations can be anticipated.

In this way, the drive system torque control mode (i.e., torque distribution mode) of the vehicle according to the present disclosure may include the following four modes distinguished according to vehicle driving states in consideration of the above-mentioned characteristics.

1) Reverse-direction distribution in acceleration direction
2) Reverse-direction distribution in regenerative direction
3) Same-direction distribution in acceleration direction
4) Same-direction distribution in regenerative direction The present disclosure proposes a switching (transition) condition and a switching method between modes capable of securing driving performance and drivability of an electric vehicle in a state where the above-mentioned four drive system torque control modes are set in the controller 20.

Control for mode determination and mode switching is performed based on vehicle driving information by the controller 20, in which the vehicle driving information includes a pedal input value, which is a driver's driving input information, and the pedal input value includes an accelerator position sensor value and a brake position sensor value. The accelerator position sensor value and the brake position sensor value may be acquired from signals of an accelerator position sensor (APS) and a brake position sensor (BPS) in the driving information detection unit 10.

Figure 2:
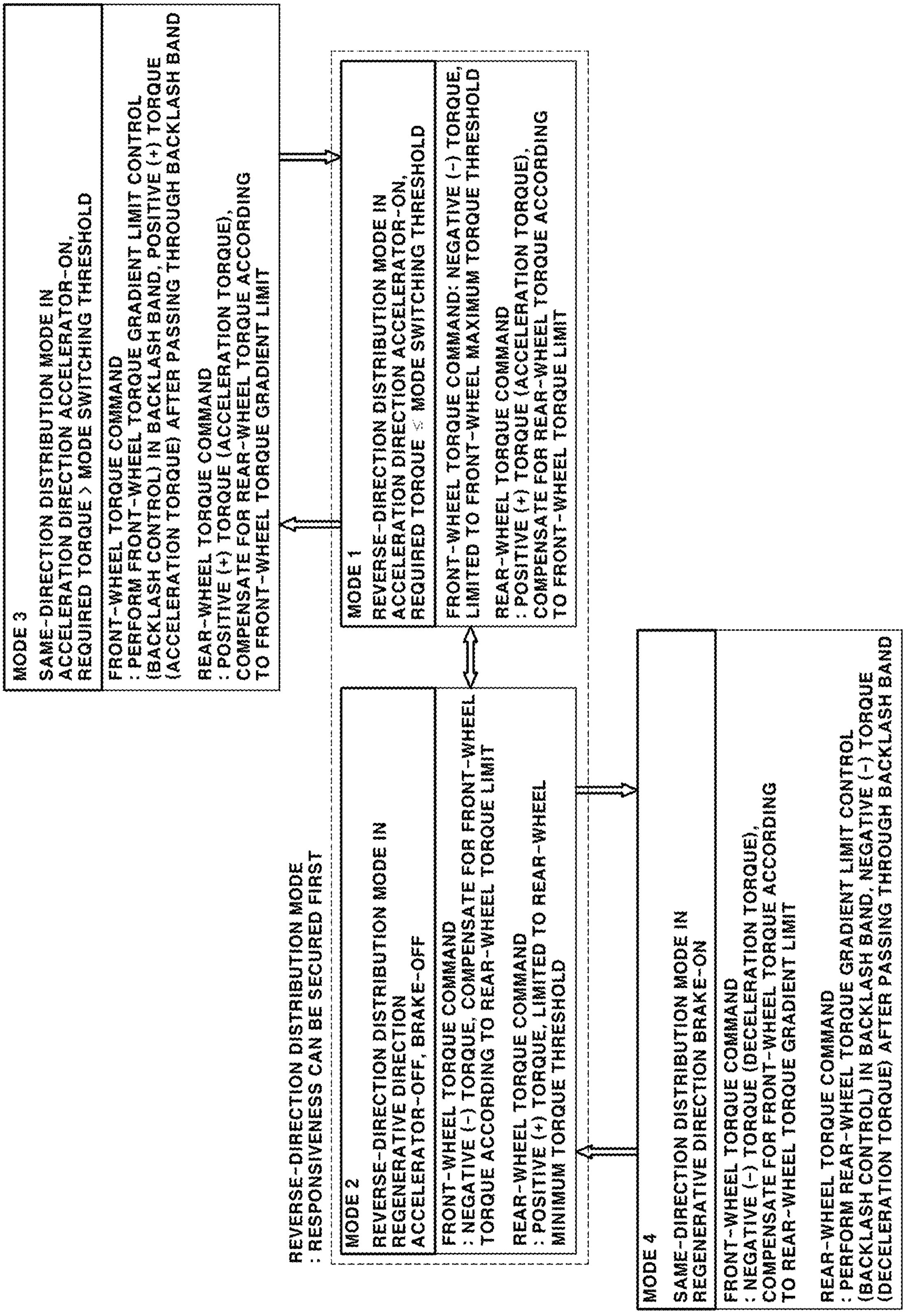
FIG. 2 is a diagram showing types of drive system torque control modes and mode switching conditions and methods according to an embodiment of the present disclosure.

FIG. 2 is a diagram showing types of drive system torque control modes and mode switching conditions and methods in the present disclosure. In the following description, "accelerator-on" and "brake-on" are defined as a state with pedal input in which a driver depresses a corresponding pedal and applies pressure thereto, that is, a pressure-applied state, or a depressed state of the accelerator and brake.

In addition, "accelerator-off" and "brake-off" are defined as a state without pedal input in which the driver does not depress the pedal, that is, a pressure-released state, or a released state of the accelerator and brake.

In the present disclosure, the accelerator-on and-off states and the brake-on and -off states may be recognized in real time by the controller 20 from signals of the accelerator position sensor and the brake position sensor in the driving information detection unit 10.

In the present disclosure, in a state where the driver releases both the accelerator and the brake (off), and in a state where the driver depresses the accelerator (on) and the required torque (command) according to the accelerator position sensor value is below a preset mode switching threshold, the controller 20 may select the reverse-direction distribution mode.

Here, the required torque is a required torque before distribution, and may be the sum of the front-wheel torque and the rear-wheel torque. In this specification, the required torque (command) necessary for vehicle driving, the total torque command, and the sum torque command have the same meaning.

In a state where both the accelerator and the brake are off, the reverse-direction distribution mode in the regenerative direction ("mode 2" in FIG. 2) is selected by the controller 20, and in a state where the driver depresses the accelerator (accelerator-on) and the required torque is below the mode switching threshold, the reverse-direction distribution mode in the acceleration direction ("mode 1" in FIG. 2) is selected by the controller 20.

In addition, when the driver depresses the accelerator (accelerator-on) in a state where the reverse-direction distribution mode in the regenerative direction is selected, the mode is switched to the reverse-direction distribution mode in the acceleration direction, and conversely, when the driver releases the accelerator (accelerator-off) in a state where the reverse-direction distribution mode in the acceleration direction is selected, the mode is switched to the reverse-direction distribution mode in the regenerative direction.

In addition, after switching from the reverse-direction distribution mode in the regenerative direction to the reverse-direction distribution mode in the acceleration direction, since the reverse-direction distribution mode in the acceleration direction is maintained until the required torque corresponding to the accelerator position sensor value (APS value) reaches the mode switching threshold, zero-crossing of the front-wheel torque and rear-wheel torque is not necessary.

Here, the mode switching threshold may be set to a positive (+) torque value. Additionally, the mode switching threshold may be a preset value within a required torque value range that can be satisfied only by the torque of the rear-wheel motor.

Further, in terms of the mode switching threshold, a mode switching threshold for switching from the reverse-direction distribution mode ("mode 1" in FIG. 2) to the same-direction distribution mode ("mode 3" in FIG. 2) and a mode switching threshold for switching and re-entering from the same-direction distribution mode to the reverse-direction distribution mode may be set to different values.

In addition, in a case where the required torque for vehicle driving, i.e., the required torque corresponding to the accelerator position sensor value exceeds the mode switching threshold, or in a case where the driver depresses the brake (brake-on), the reverse-direction distribution mode is terminated and switched to the same-direction distribution mode by the controller 20.

In the present disclosure, in the reverse-direction distribution mode in the acceleration direction, in a case where the required torque for driving the vehicle, i.e., the required torque corresponding to the accelerator position sensor value exceeds the mode switching threshold, the mode is switched to the same-direction distribution mode in the acceleration direction ("mode 3" in FIG. 2) by the controller 20.

In addition, in the reverse-direction distribution mode in the regenerative direction, in a case where the driver depresses the brake (brake-on), the reverse distribution mode in the regenerative direction is switched to the same-direction distribution mode in the regenerative direction ("mode 4" in FIG. 2) by the controller 20.

Further, in a case where the required torque decreases to below the mode switching threshold in the same-direction distribution mode in the acceleration direction, or in a case where the driver releases the brake (brake-off) in the same-direction distribution mode in the regenerative direction, the same-direction distribution mode is terminated and returns to the reverse-direction distribution mode by the controller 20.

As described above, when switching from the same-direction distribution mode to the reverse-direction distribution mode or from the reverse-direction distribution mode to the same-direction distribution mode, zero-crossing occurs, which may make it difficult to immediately perform mode switching for responding to an area where backlash shock occurs. However, this time delay may provide natural drivability in combination with a time period from the driver's brake release to the accelerator position sensor input.

Further, in the mode switching strategy according to the present disclosure, since the zero-crossing of only one of the front and rear-wheel motor torques occurs in switching between the same-direction distribution mode and the reverse-direction distribution mode, the response delay of the one of the front and rear-wheel motor torques caused by the zero-crossing may be significantly compensated for by using the other motor.

Figure 3:
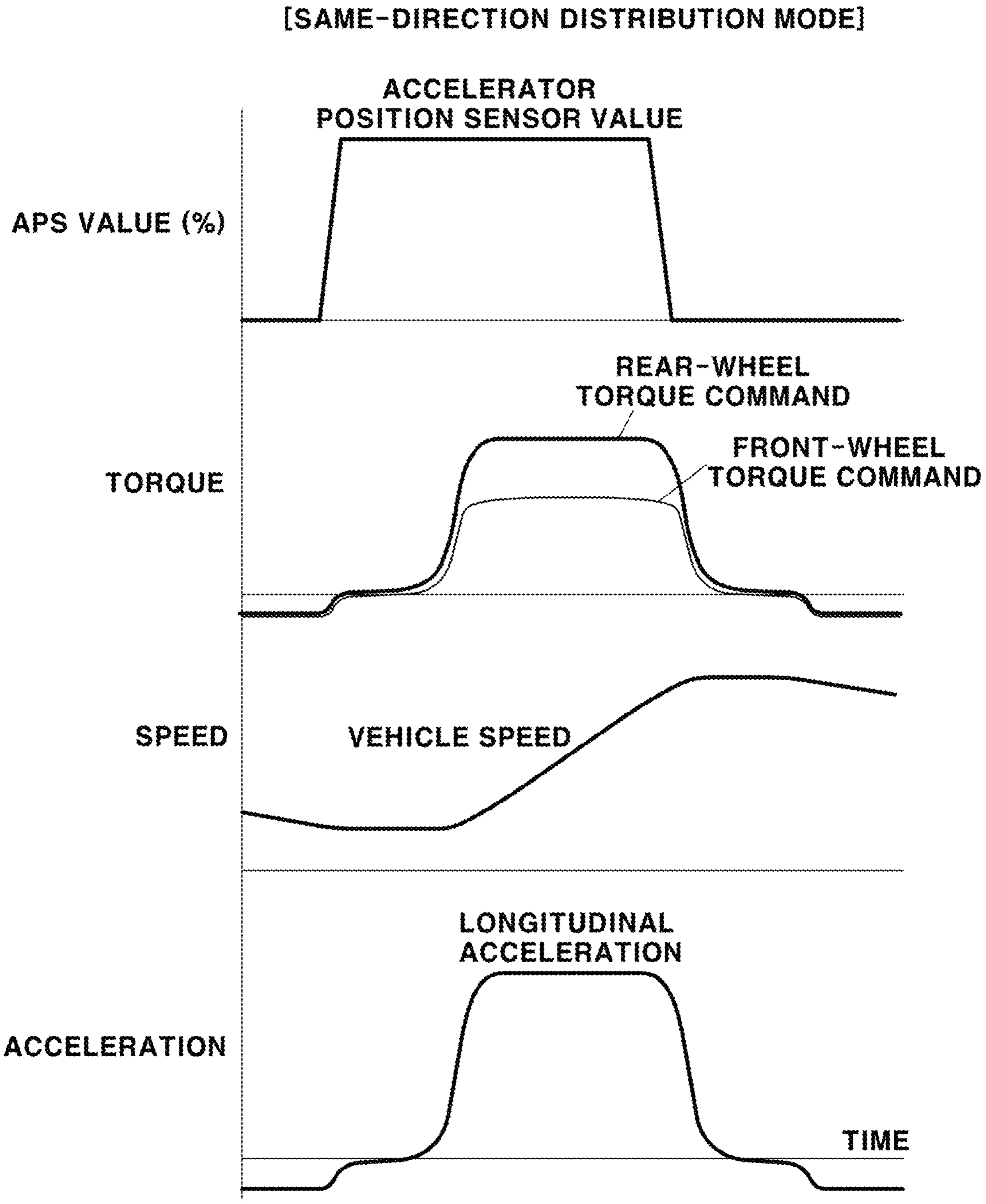
FIG. 3 is a diagram illustrating a torque control state in the same-direction distribution mode according to an embodiment of the present disclosure.

Hereinafter, control states of the same-direction distribution mode and the reverse-direction distribution mode will be described in more detail with reference to FIGS. 3 and 4. FIG. 3 is a diagram illustrating a torque control state in the same-direction distribution mode, and FIG. 4 is a diagram illustrating a torque control state in the reverse-direction distribution mode.

Figure 4:
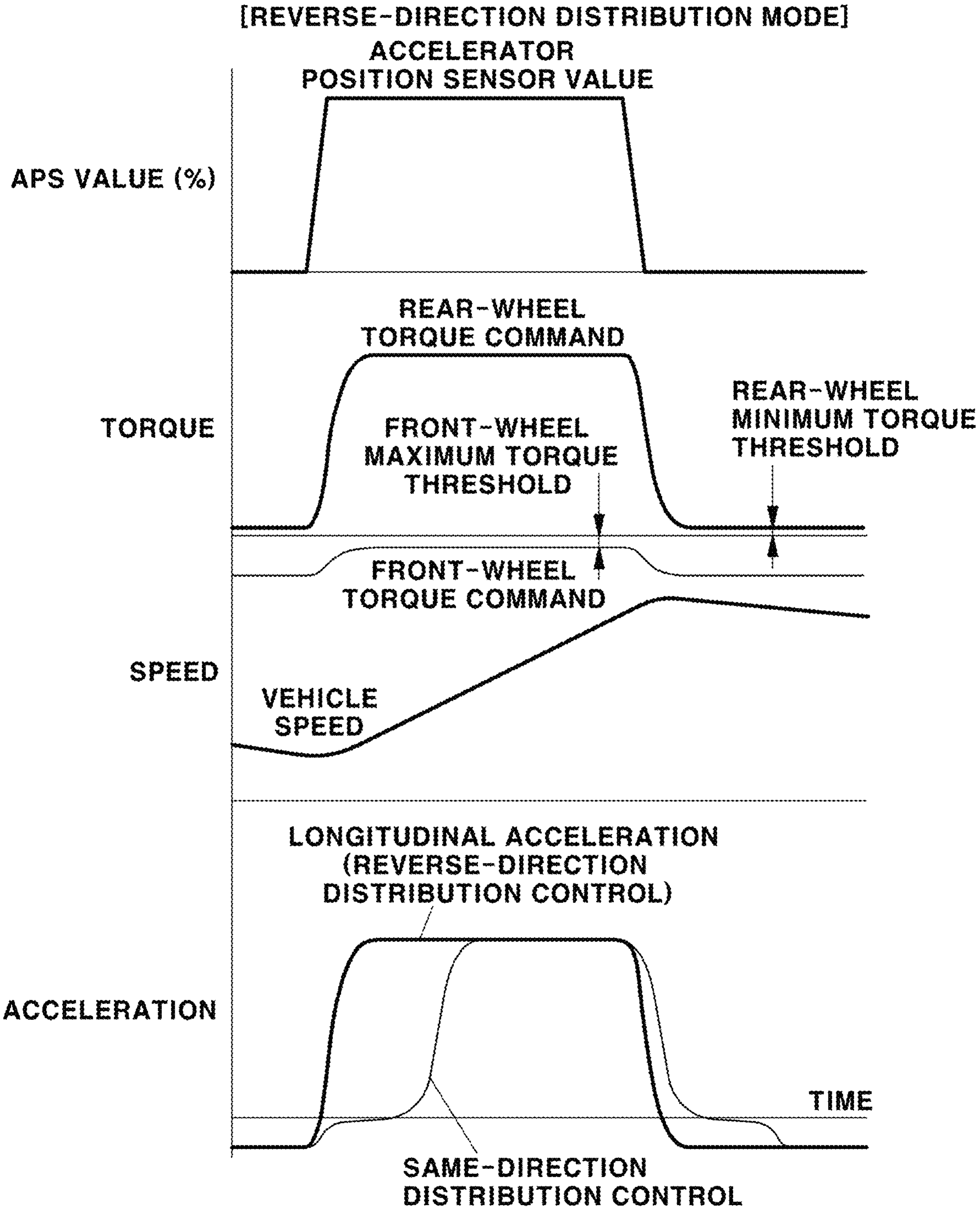
FIG. 4 is a diagram illustrating a torque control state in the reverse-direction distribution mode according to an embodiment of the present disclosure.

In the present disclosure, while the required torque is changed in direction and increases or decreases, the switching between the same-direction distribution mode as in FIG. 3 and the reverse-direction distribution mode as in FIG. 4 is performed according to the required torque.

FIGS. 3 and 4 illustrate examples in which only the same-direction distribution mode and the reverse-direction distribution mode are performed independently, respectively, without the above-mentioned torque distribution mode switching over the entire range of the required torque and the entire time during which the required torque changes.

FIGS. 3 and 4 show front and rear-wheel torque distribution states and front and rear-wheel torque command determination methods by the controller 20 in the same-direction distribution mode control and the reverse-direction distribution mode control in a case where the accelerator position sensor value (APS value) is detected through the accelerator position sensor of the driving information detection unit 10.

In the same-direction distribution mode, the front-wheel torque and rear-wheel torque are determined as torques in the same direction, and the required torque is satisfied by the sum of the distributed front-wheel torque and rear-wheel torque. In FIG. 3, the direction of the required torque is switched to the positive (+) direction, i.e., the vehicle acceleration direction, by the accelerator tip-in.

In the same-direction distribution mode, in a case where the direction of the required torque is changed due to zero-crossing the required torque, the directions of the front-wheel torque and the rear-wheel torque also are changed to cause zero-crossing through the backlash band, and thus, a gradient of the torque value change is limited while the front-wheel torque and rear-wheel torque pass through the backlash band.

In the same-direction distribution mode, the front-wheel torque command and the rear-wheel torque command are determined in all torque ranges of positive (+) and negative (−) values according to the total torque command (summed torque command), which is the required torque command before distribution.

That is, in the same-direction distribution mode, in a case where the required torque is in the positive (+) direction of vehicle acceleration, both the front-wheel torque and the rear-wheel torque are determined as torque values in the positive (+) direction, that is, the driving direction, and in a case where the required torque is in the negative (−) direction of vehicle deceleration, both the front-wheel torque and the rear-wheel torque are determined as torques in the negative (−) direction, that is, the regenerative direction.

For example, in a situation where there is no accelerator position sensor value from a driver, as in FIG. 3, i.e., in a vehicle deceleration situation where the driver does not depress the accelerator, both the front-wheel torque command and the rear-wheel torque command may be determined as negative (−) torque values.

Then, in a case where the driver depresses the accelerator for vehicle acceleration, both the front-wheel torque command and the rear-wheel torque command change from negative (−) torque values to positive (+) torque values in the same-direction distribution mode. In this way, in a case where the torque direction change occurs, both the front-wheel torque command and the rear-wheel torque command inevitably pass through the backlash band.

In addition, in a state where the driver depresses the accelerator, the sum of the front-wheel torque command and the rear-wheel torque command must follow the total torque command (required torque), and in this case, the front-wheel torque command and the rear-wheel torque command are determined by a normal front and rear-wheel torque distribution process of distributing the total torque command according to the front and rear-wheel distribution ratio.

However, while the front-wheel torque command and rear-wheel torque command pass through the backlash band, the direction of the torque applied from the motor to the drive system does not change rapidly so that the backlash problem can be minimized even if the driver depresses the accelerator.

That is, as can be seen in FIG. 3, in the same-direction distribution mode, the front-wheel torque command and the rear-wheel torque command do not change from the negative (−) torque to the positive (+) torque immediately when the driver depresses the accelerator, but instead, the front-wheel torque command and the rear-wheel torque command are determined so that the torque applied to the drive system by the motor can change the direction while passing through the backlash band for a predetermined time after the accelerator is depressed.

Specifically, during passing through the backlash band, a change rate limiting control for limiting a change rate (gradient) of the front-wheel torque command and the rear-wheel torque command is performed, thereby preventing the torque command from increasing rapidly. In the case of the same-direction distribution mode, the backlash control is performed so that a gentle torque change occurs within the backlash band for both the front-wheel torque command and the rear-wheel torque command.

To this end, a maximum allowable change rate (maximum allowable gradient) in the backlash band for the front-wheel torque command and the rear-wheel torque command may be set to a small value that does not cause backlash shock in the controller 20.

While the front-wheel torque command and the rear-wheel torque command increase and pass through the backlash band, the front-wheel torque command and the rear-wheel torque command are determined as values that change smoothly according to the maximum allowable change rate of the small value in the controller 20.

Further, the front-wheel torque command and the rear-wheel torque command after passing through the backlash band have magnitudes capable of satisfying the driving torque necessary for acceleration through the normal front and rear-wheel torque distribution process.

In a case where the front-wheel torque command and the rear-wheel torque command are determined as described above, the controller 20 controls the front-wheel motor 31 and the rear-wheel motor 41 according to the determined final front-wheel torque command and rear-wheel torque command.

The reverse-direction distribution mode is a mode for separating torque operating areas for the front and rear motors to avoid zero-crossing while preventing both the front-wheel torque and the rear-wheel torque from entering the backlash band.

As described above, in the reverse-direction distribution mode, the front-wheel torque and the rear-wheel torque may be determined as torques in opposite directions, and may be determined to satisfy the required torque by the sum of the two distributed torques.

As can be seen in FIG. 4, in the reverse-direction distribution mode, regardless of whether the required torque is a positive (+) direction torque in the vehicle acceleration direction or a negative (−) direction torque in the vehicle deceleration direction, the front-wheel torque is determined as a negative (−) direction torque in the regenerative direction, and the rear-wheel torque is determined as a positive (+) direction torque in the driving direction.

To this end, in the reverse-direction distribution mode, backlash band avoidance control for limiting the front-wheel torque command to a value equal to or lower than the front-wheel maximum torque threshold or limiting the rear-wheel torque command to a value equal to or greater than the rear-wheel minimum torque threshold is performed by the controller 20.

However, in the reverse-direction distribution mode, the front motor 31 and the rear motor 41 do not generate driving forces in the same direction or regenerative braking forces in the same direction, and the front motor 31 only performs regenerative braking and the rear motor 41 only performs driving. Accordingly, it is difficult to drive the vehicle and perform regenerative braking at maximum output.

Instead, in the reverse-direction distribution mode, unlike the same-direction distribution mode, that is, a typical drive system torque control mode, since the zero-crossing of the front-wheel torque command or the rear-wheel torque command, passing 0 torque within the backlash band, is unnecessary, it is possible to secure responsiveness.

On the other hand, in a case where the reverse-direction distribution mode is released to enter the same-direction distribution mode, since the front-wheel motor 31 and the rear-wheel motor 41 cooperate for driving and regeneration, it is possible to drive and regenerate the vehicle at maximum output.

However, in the same-direction distribution mode, the directions of the front-wheel torque command and the rear-wheel torque command are changed when the direction of the required torque is changed. Here, since the zero-crossing of the torque is inevitable to limit the change rate of each torque command, a delay in responsiveness inevitably occurs.

Referring to FIG. 4, in the reverse-direction distribution mode, in a deceleration section where the driver does not depress the accelerator and the vehicle is decelerating, the total torque command finally determined from the required torque has a negative (−) torque value as a regenerative braking torque command.

In the reverse-direction distribution mode, even in the deceleration section where the vehicle is decelerating, the rear-wheel torque command is determined as a value that is equal to or greater than the rear-wheel minimum torque threshold set as a positive (+) torque value, and the front-wheel torque command is determined as a value (negative value) obtained by subtracting the determined rear-wheel torque command (positive torque) from the total torque command (negative torque).

Here, as a result of comparison of the total torque command and the rear-wheel minimum torque threshold, in a case where the total torque command is equal to or lower than the rear-wheel minimum torque threshold, the controller 20 determines the rear-wheel torque command as the rear-wheel minimum torque threshold, and determines the remaining torque obtained by subtracting the rear-wheel minimum torque threshold from the total torque command as the front-wheel torque command to follow the total torque command.

The front-wheel torque command determined in this way has a negative (−) torque value. Accordingly, the rear-wheel motor 41 outputs a driving torque, which is a positive torque, and applies the output torque to the drive system, and the front-wheel motor 31 outputs a regenerative braking torque, which is a negative torque, and applies the output torque to the drive system.

Then, in a case where the driver depresses the accelerator, immediately upon depressing the accelerator, the front-wheel torque command may be determined as the front-wheel maximum torque threshold set as a negative (−) torque value, and the rear-wheel torque command may be determined as a positive (+) torque value obtained by subtracting the determined front-wheel torque command (negative torque) from the total torque command (positive torque) corresponding to the accelerator position sensor value.

Here, as a comparison of the total torque command and the front-wheel maximum torque threshold, in a case where the total torque command is equal to or greater than the front-wheel maximum torque threshold, the controller 20 determines the front-wheel torque command as the front-wheel maximum torque threshold, and determines the remaining torque obtained by subtracting the front-wheel maximum torque threshold from the total torque command as the rear-wheel torque command to follow the total torque command.

While the driver is depressing the accelerator, the front-wheel motor 31 may output a negative (−) torque corresponding to the front-wheel maximum torque threshold, and the rear-wheel motor 41 may output a positive (+) torque obtained by subtracting the front-wheel motor command (negative torque) from the total torque command (positive torque).

Then, in a case where the driver lifts his foot off (tip-out) the accelerator, the rear-wheel torque command may be determined again as the rear-wheel minimum torque threshold, and the front-wheel torque command may be determined as a negative (−) torque value obtained by subtracting the rear-wheel torque command (positive torque) from the total torque command (negative torque) which is the regenerative braking torque.

In a case where the front-wheel torque command and the rear-wheel torque command are determined in this way, the controller 20 controls the operation of the front-wheel motor 31 and the rear-wheel motor 41 according to the front-wheel torque command and the rear-wheel torque command.

The torque control method for the drive system of the electric vehicle according to the present disclosure includes a control method in switching of the drive system torque control mode, and more specifically, includes a torque correction method for alleviating backlash shock in switching between the drive system torque control modes.

Here, the switching of the drive system torque control mode refers to switching of the torque distribution mode, and more specifically, includes switching between the same-distribution mode and the reverse-direction distribution mode.

Hereinbefore, the method of performing the torque correction for limiting the change rate of the front-wheel torque command or the rear-wheel torque command during passing through the backlash band to cause the zero-crossing has been described.

In this disclosure, the zero-crossing of the front-wheel torque command and the rear-wheel torque command is sequentially performed based on the required torque, and while the zero-crossing correction for one of the front-wheel torque command and the rear-wheel torque command is performed, for the other torque command, correction may be performed using a torque correction amount determined based on a backlash estimation value of the drive system in which the zero-crossing occurs.

In the drive system torque control mode of the electric vehicle, i.e., the torque distribution mode, in a case where there are the same-direction distribution mode and the reverse-direction distribution mode in which torque distribution methods for the front and rear-wheels are different, switching between the distribution modes occurs in a case where the vehicle driving state is changed and the direction of the required torque is changed.

Considering the fundamental characteristics of the distribution modes, there is a characteristic that the passage through the backlash band occurs only when there is a torque command change between the distribution modes. Accordingly, reliable backlash band determination may be made using a method of determining whether to perform torque correction in the backlash band according to whether to perform the switching between the distribution modes.

In the embodiment of the present disclosure, a backlash value of the drive system is estimated for torque correction for reducing backlash shock, but since noise is included in vehicle speed or motor speed information, the backlash estimation value may also include noise. Therefore, an accurate backlash band identification strategy is effective in removing noise in a region that is not the backlash band.

It is possible to remove a conflict between noise removal and effective signal amplification by partial validation of the backlash estimation value. That is, the backlash estimation value may be invalidated in a case where there is no distribution mode switching, and may be validated only in a case where there is the distribution mode switching so that only the backlash estimation value in validation can be used for correction control.

As described above, in the embodiment of the present disclosure, when one of the front-wheel torque command and the rear-wheel torque command causes zero-crossing, the torque correction may be performed to limit the change rate of the zero-crossing torque command to a set change rate.

Here, a torque correction amount for reducing the backlash shock may be calculated based on the backlash estimation value of the drive system in which the torque command causes zero-crossing, and torque correction may be performed using the calculated torque correction amount for the other torque command that does not cause zero-crossing.

Specifically, the backlash estimation value of the front-wheel drive system may be used to calculate a torque correction amount for reducing backlash shock in zero-crossing of the front-wheels, and the backlash estimation value of the rear-wheel drive system may be used to calculate a torque correction amount for reducing backlash shock in zero-crossing of the rear-wheel.

Although it is possible to utilize the torque correction amount calculated as above, in a case where the torque correction amount is calculated from the backlash estimation value, another weight, filter, change rate (gradient) limit, or dead zone, etc. may be applied to the calculated torque correction amount, similar to examples of FIGS. 5 to 8, and then, the result may be used as the final torque correction amount.

In addition, in the present disclosure, a method of invalidating, filtering, or extending a backlash-estimated dead zone in a torque section where correction is unnecessary may be applied so as to effectively use the backlash estimation value only in a limited section where torque correction is necessary.

In general, the backlash estimation value includes noise. Although characteristics of noise may vary depending on the backlash estimation method or the specifications of the sensor basically used, a technique of processing the noise is essential due to characteristics of the backlash band that requires rapid correction.

However, as the noise is removed clearly, the backlash estimation value that must be monitored to actually calculate the torque correction amount is also partially deleted, thereby resulting in insufficient or delayed torque correction. To overcome these limitations, it is effective to selectively adjust the noise processing sensitivity or width as needed.

In the present disclosure, the torque correction amount may be determined as a value obtained by selectively applying one or more of the weight, filter, change rate (gradient) limit, and dead zone to the backlash estimation value by the controller 20.

Here, a torque range in which the backlash may occur, that is, the backlash band may be set as a torque section in which correction is necessary, and a method of variably adjusting the weight applied to the backlash estimation value, a time constant of the filter applied to the backlash estimation value, a change rate (gradient) limit value applied to the backlash estimation value, and the dead zone applied to the backlash estimation value may be applied.

In addition, the method of variably adjusting the above-mentioned weight, filter time constant, change rate limit value, and dead zone with reference to a zero-crossing start point may be applied.

Further, the method of variably adjusting the above-mentioned weight, filter time constant, change rate limit, and dead zone depending on whether or not a mode transition is in progress, based on torque command mode transition information between the same-direction distribution mode and the reverse-direction distribution mode, may be used.

In a section where torque correction is necessary to reduce the backlash shock, the following steps may be performed:

1) Increase the weight applied to the backlash estimation value;
2) Reduce the time constant of the filter applied to the backlash estimation value or increase the gain of the filter;
3) Increase the change rate (gradient) limit applied to the backlash estimation value (i.e. relax the change rate limit); and
4) Reduce the dead zone applied to the backlash estimation value.

In relation to adjusting the weight, the time constant or the gain of the filter, the change rate limit value, and the dead zone as described above, the correction of the backlash estimation value in the present disclosure should be performed in real time as necessary, and in particular, depending on whether the current torque causes zero-crossing or not.

However, since whether or not the current torque causes zero-crossing depends on the required torque, it is possible to determine in real time whether or not to perform correction using the required torque value.

Here, a method of determining whether or not to perform correction to diversify a correction range may be used as the above-mentioned adjustment method using the parameters such as the weight, time constant or gain of the filter, change rate limit, and dead zone.

In this way, it is possible to determine whether or not to perform correction using the required torque value, and the weight, filter time constant or gain, change rate limit, and dead zone may be adjusted as the variables of the required torque value.

In addition, after making a map that uses, as input, one or more of information values such as current torque estimation value, accelerator position sensor value, vehicle speed, and motor speed along with the above-mentioned required torque value, the values of the weight, filter time constant or gain, change rate limit value, and dead zone may be determined and adjusted from the map.

In the present disclosure, during the switching between the same-direction distribution mode and the reverse-direction distribution mode, the backlash estimation value of the drive system in which the zero-crossing occurs is calculated, the torque correction amount is determined based on the calculated backlash estimation value, and then, the torque command of the drive system in which the zero-crossing does not occur is corrected using the determined torque correction amount.

FIGS. 5 to 8 are drawings showing several examples of correcting a backlash estimation value to determine a corrected backlash estimation value, in which the corrected backlash estimation value in the drawings corresponds to the above-mentioned torque correction amount.

The process of calculating the backlash estimation value with reference to FIGS. 5 to 8 and then determining the torque correction amount (corrected backlash estimation value) using the calculated backlash estimation value will be described.

First, in the process of calculating the backlash estimation value of the drive system in which the zero-crossing occurs, the torque correction amount may be determined by applying a weight to a raw backlash estimation value (referred to hereinafter as "raw backlash estimation value") that is calculated first and then not processed. Here, the weight may be adjusted by the controller 20 as shown in FIG. 5, and may be a variable value determined based on the required torque.

Figure 5:
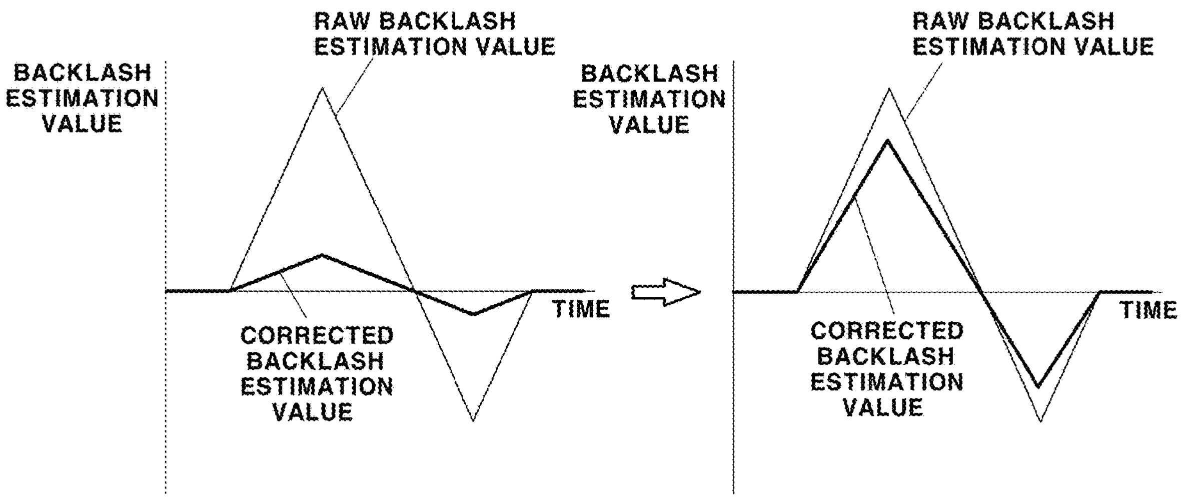
FIG. 5, FIG. 6, FIG. 7 and FIG. 8 are drawings showing several examples of correcting a backlash estimation value to determine a corrected backlash estimation value according to an embodiment of the present disclosure.

The graph on the right in FIG. 5 shows an example in which the backlash estimation value is corrected by increasing the weight compared to the left, and the corrected backlash estimation value may be used as the torque correction amount.

In the present disclosure, when the front-wheel torque command causes zero-crossing, the backlash estimation value for the front-wheel drive system is calculated, and then, the torque correction amount may be determined as a value obtained by multiplying the calculated backlash estimation value by a weight determined according to the required torque.

Here, the backlash estimation value may be one or both of a backlash speed estimation value and a backlash acceleration estimation value, and the backlash acceleration estimation value may be obtained by differentiating the backlash speed.

In a case where the backlash speed estimation value or the backlash acceleration estimation value of the front-wheel drive system is calculated as the backlash estimation value of the front-wheel drive system, the torque correction amount for the rear-wheel torque command may be determined as a value obtained by multiplying the backlash speed estimation value or the backlash acceleration estimation value of the front-wheel drive system by a weight.

Alternatively, the torque correction amount for the rear-wheel torque command may be determined as the sum of a value obtained by multiplying the backlash speed estimation value of the front-wheel drive system by a first weight according to the required torque and a value obtained by multiplying the backlash acceleration estimation value of the front-wheel drive system by a second weight according to the required torque and applying a filter and a change rate (gradient) limit to the summed value.

Similarly, when the rear-wheel torque command causes zero-crossing, the controller 20 calculates the backlash estimation value for the rear-wheel drive system, and calculates a torque correction amount for the front-wheel torque command based on the calculated backlash estimation value for the rear-wheel drive system, and then compensates for the front-wheel torque command with the calculated torque correction amount.

Here, a value obtained by multiplying the backlash speed estimation value of the rear-wheel drive system or the backlash acceleration estimation value of the rear-wheel drive system by the weight value may be determined as the torque correction amount for the front-wheel torque command.

Alternatively, the torque correction amount for the front-wheel torque command may be determined as the sum of a value obtained by multiplying the backlash speed estimation value of the rear-wheel drive system by a first weight according to the required torque and a value obtained by multiplying the backlash acceleration estimation value of the rear-wheel drive system by a second weight according to the required torque and applying a filter and a change rate (gradient) limit to the summed value.

Korean Patent Publication No. 10-2021-0020189 (Feb. 24, 2021, U.S. Pat. No. 11,625,959) filed by the present inventors discloses a method for calculating and estimating a backlash speed, and the backlash speed estimation value of the present disclosure may be determined by the method disclosed in the above patent document.

According to the above-mentioned patent document, the backlash speed of the front-wheel drive system may be determined from a rotational speed difference between the front-wheel motor and the front-wheels, and the front-wheel torque command which is the front-wheel motor torque command, and the backlash speed of the rear-wheel drive system may be determined from a rotational speed difference between the rear-wheel motor and the rear-wheels, and the rear-wheel torque command which is the rear-wheel motor torque command.

Additionally, by applying a change rate limit to the raw backlash estimation value, the torque correction amount may be determined as a change rate limit value. Here, the change rate limit value may be a variable value that is adjusted according to the required torque, as shown in FIG. 6.

Figure 6:
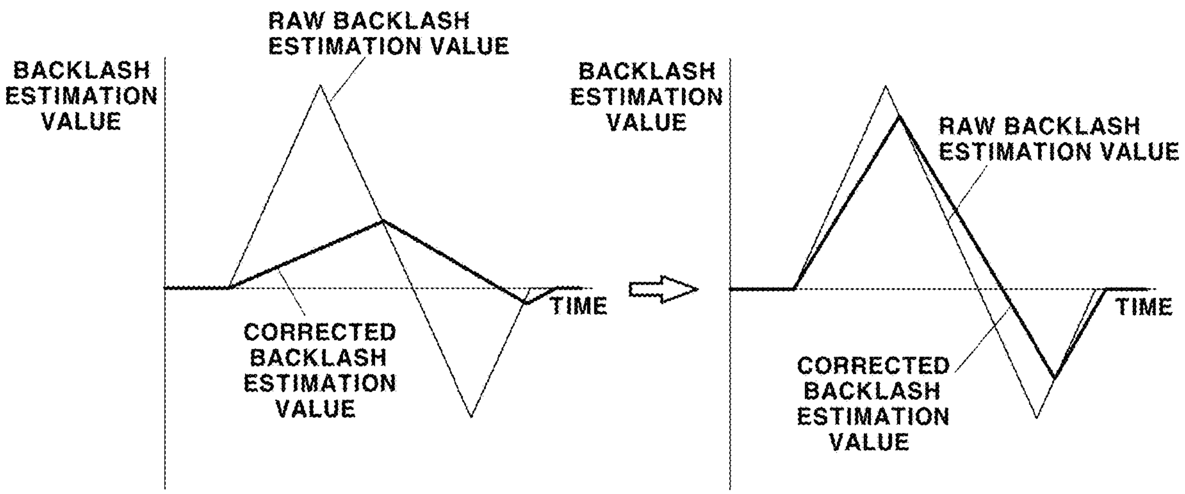

The graph on the right in FIG. 6 shows an example in which the backlash estimation value is corrected by increasing the change rate limit value compared to the left, in which the backlash estimation value after correction may be used as the torque correction amount.

Further, the torque correction amount may be determined as a value obtained by applying a filter to the raw backlash estimation value. Here, the time constant or gain of the filter may be a variable value that is adjusted based on the required torque as shown in FIG. 7.

Figure 7:
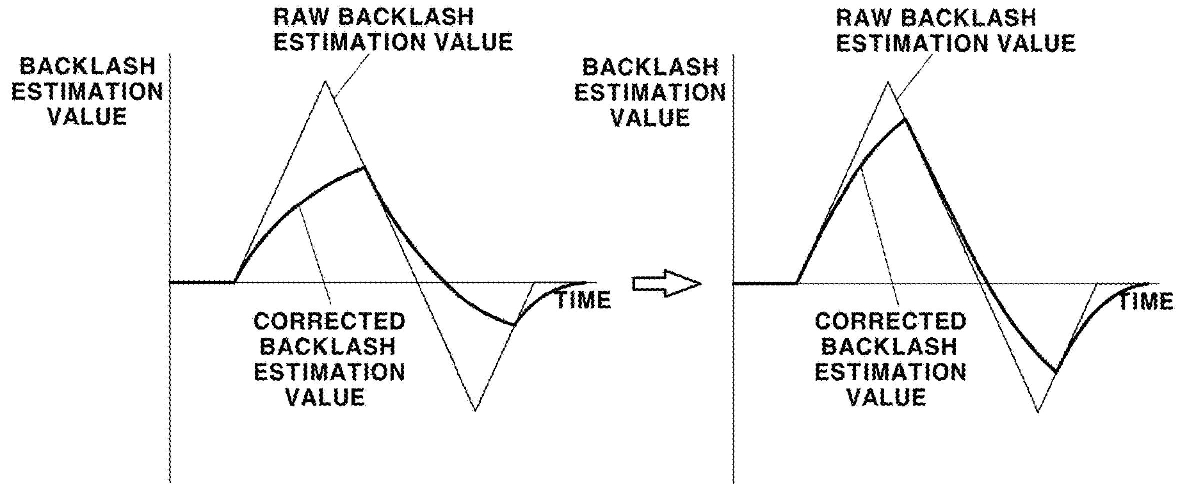

The graph on the right in FIG. 7 shows an example in which the backlash estimation value is corrected by reducing the time constant of the filter or increasing the gain of the filter compared to the left, in which the backlash estimation value after correction may be used as the torque correction amount.

Figure 8:
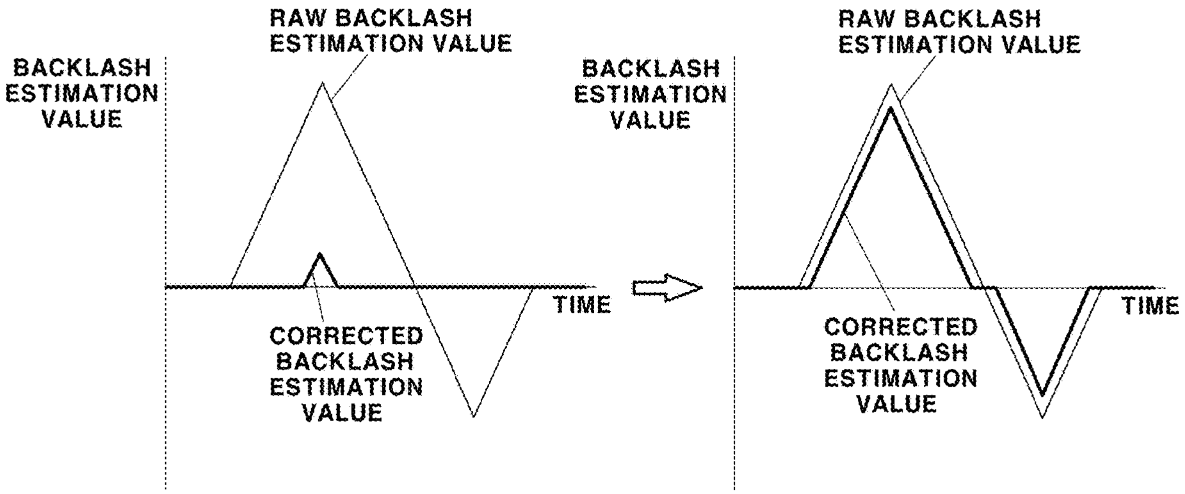

Further, the torque correction amount may be determined by applying a dead zone to the raw backlash estimation value, in which the dead zone may be expanded or reduced depending on the required torque as shown in FIG. 8.

The graph on the right in FIG. 8 shows an example in which the backlash estimation value is corrected by reducing the dead zone compared to the left, in which the backlash estimation value after correction may be used as the torque correction amount.

Figure 9:
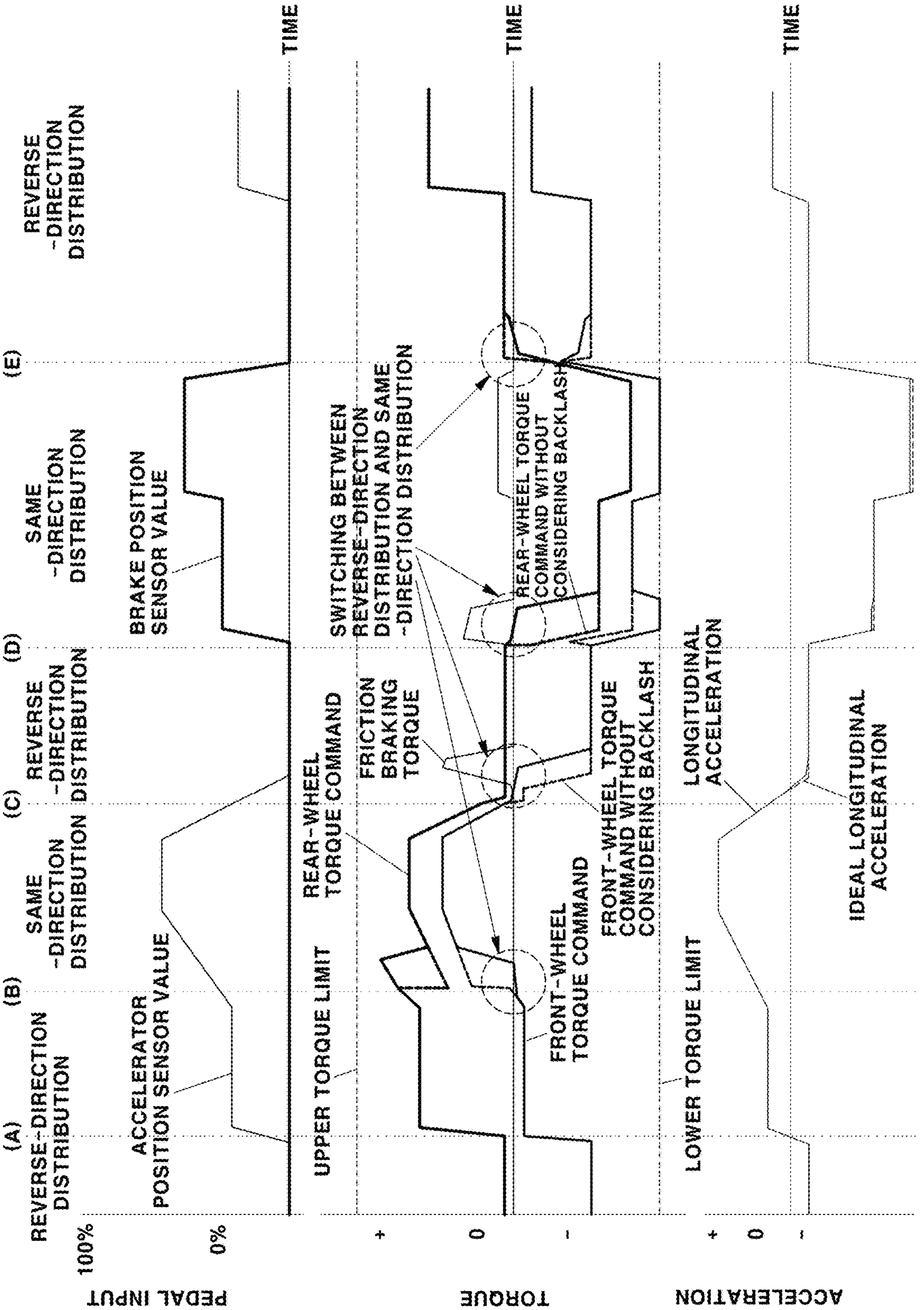
FIG. 9 is a drawing illustrating a torque control state according to an embodiment of the present disclosure.

FIG. 9 is a drawing illustrating a torque control state according to an embodiment of the present disclosure. Hereinafter, a torque control method according to an embodiment of the present disclosure will be described in more detail with reference to FIGS. 2 and 9.

The torque control method according to the embodiment of the present disclosure is performed by a controller 20, and includes determining a required torque for vehicle driving, determining a torque control mode corresponding to a current vehicle driving state among a plurality of preset torque control modes and switching to the determined torque control mode, determining a front-wheel torque command and a rear-wheel torque command according to the switched torque control mode from the determined required torque, and controlling a front-wheel motor and a rear-wheel motor according to the determined front-wheel torque command and rear-wheel torque command.

Here, the plurality of torque control modes may include a reverse-direction distribution mode in an acceleration direction in which the front-wheel torque command is determined as a front-wheel maximum torque threshold and the rear-wheel torque command is determined as a positive (+) torque value, and a reverse-distribution mode in a regenerative direction in which the rear-wheel torque command is determined as a rear-wheel minimum torque threshold and the front-wheel torque command is determined as a negative (−) torque value.

The plurality of torque control modes may further include a same-direction distribution mode in an acceleration direction in which both the front-wheel torque command and the rear-wheel torque command are determined as positive (+) torque values.

In addition, the plurality of torque control modes may further include a same-direction distribution mode in a regenerative direction in which both the front-wheel torque command and the rear-wheel torque command are determined as negative (−) torque values.

Referring to FIG. 9, the present disclosure does not consistently use the reverse-direction distribution or the same-direction distribution, but rather uses the reverse-direction distribution mode and the same-direction distribution mode together. In FIG. 9, a situation where switching occurs between the reverse-direction distribution mode and the same-direction distribution mode is indicated by a dashed circle.

Further, in the present disclosure, mode selection and switching appropriate for situations in the reverse-direction distribution mode and the same-direction distribution mode are performed by the controller 20. Accordingly, as shown in FIG. 2, depending on the situations, the front-wheel torque command and the rear-wheel torque command may have opposite signs or the same signs.

In a case where the driver depresses the accelerator at a time-point (A) in FIG. 9 (accelerator-on), the required torque (=sum torque command, total torque command) before the accelerator is depressed is a negative (−) value, but the required torque increases to a positive (+) value after the accelerator is depressed (torque direction change, "required torque≤mode switching threshold").

Accordingly, according to the above-described mode switching method, at the time-point (A) when the driver depresses the accelerator, the torque control mode of the vehicle is switched from the reverse-direction distribution mode in the regenerative direction ("mode 2" in FIG. 2) to the reverse-direction distribution mode in the acceleration direction ("mode 1" in FIG. 2).

Even in this case, since the mode switching is switching between the reverse-direction distribution modes, the reverse-direction distribution method is still maintained, so that there is no need for both the front-wheel torque command and the rear-wheel torque command to cause zero-crossing. As a result, since there is no zero-crossing of the front and rear torque commands, it is possible to achieve desired vehicle acceleration responsiveness without concern for backlash shock.

In addition, from the time-point (A), in a situation where acceleration torque is necessary for vehicle acceleration, the front-wheel torque command, which has a negative (−) torque value in the reverse-direction distribution mode in the regenerative direction, increases to the front-wheel maximum torque threshold, which is not a positive (+) torque value but a negative (−) torque value, in switching to the reverse-direction distribution mode in the acceleration direction after the accelerator is depressed.

In the case of the rear-wheel torque command, the rear-wheel minimum torque threshold, which is a positive (+) torque value, is maintained during the reverse-direction distribution mode in the regenerative direction before the accelerator is depressed, and then, increases to achieve the desired vehicle acceleration in switching to the reverse-direction distribution mode in the acceleration direction after the accelerator is depressed.

In this way, since the reverse-direction distribution mode is maintained before and after the accelerator is depressed, the front-wheel torque command is determined as a negative (−) torque, and the rear-wheel torque command is determined as a positive (+) torque, so that the front-wheel torque command and the rear-wheel torque command have torque values with opposite signs and opposite directions.

Further, in the reverse-direction distribution mode ("mode 1" and "mode 2"), the front-wheel torque command is limited to a torque value that is equal to or lower than the front-wheel maximum torque threshold, which is a negative (−) value, and the rear-wheel torque command is limited to a torque value that is equal to or greater than the rear-wheel minimum torque threshold, which is a positive (+) value.

Accordingly, the front-wheel torque command and the rear-wheel torque command may be determined as values outside the backlash band without invading the backlash band where the backlash may occur in each drive system, and as a result, it is possible to implement and achieve the backlash band avoidance control.

However, in the previous mode with reference to the time-point (A), that is, in the reverse-direction distribution mode in the regenerative direction (mode 2), since the rear-wheel torque command is determined as the rear-wheel minimum torque threshold, which is a positive (+) value, compensation for the front-wheel torque according to the rear-wheel torque limit is necessary.

That is, it is necessary to compensate for the front-wheel torque command by a torque amount corresponding to the rear-wheel torque limit, and to this end, a torque value obtained by subtracting the rear-wheel minimum torque threshold from the required torque is determined as the front-wheel torque command, and the sum of the front-wheel torque command and the rear-wheel torque command is constantly set as the value of the required torque.

In addition, in the mode thereafter with reference to the time-point (A), that is, in the reverse-direction distribution mode (mode 1) in the acceleration direction, since the front-wheel torque command is determined as the front-wheel maximum torque threshold, which is a negative (−) value, compensation for the rear-wheel torque according to the front-wheel torque limit is necessary.

That is, it is necessary to compensate for the rear-wheel torque command by a torque amount corresponding to the front-wheel torque limit, and to this end, a torque value obtained by subtracting the front-wheel maximum torque threshold from the required torque is determined as the rear-wheel torque command, and the sum of the front-wheel torque command and the rear-wheel torque command is constantly set as the value of the required torque.

At the time-point (B), the driver additionally depresses the accelerator (accelerator-on), and the required torque (=sum torque command, total torque command) according to the accelerator position sensor value increases to exceed the preset mode switching threshold ("required torque>mode switching threshold").

According to the above-described mode switching method, the torque control mode of the vehicle is switched from mode 1, which is the reverse-direction distribution mode in the acceleration direction, to mode 3, which is the same-distribution mode in the acceleration direction, by the controller 20.

Here, only the front-wheel torque command passes through the backlash band while causing zero-crossing, and the rear-wheel torque command continues to maintain a positive (+) torque value. While the front-wheel torque command passes through the backlash band, the controller 20 performs correction control (backlash control) for limiting the torque change rate (gradient) as described above for the front-wheel torque command.

That is, the backlash control is performed to limit the change rate (gradient) of the front-wheel torque command when the front-wheel torque command causes zero-crossing, thereby preventing the front-wheel torque command from rapidly increasing. For the backlash control, the controller 20 sets a maximum allowable change rate in the backlash band for the front-wheel torque command to a small value that does not cause backlash shock.

Accordingly, while the front-wheel torque command increases and passes through the backlash band, the controller 20 determines the front-wheel torque command to be a value that smoothly changes along the maximum allowable change rate of the small value.

In a case where the change rate of the front-wheel torque command is limited in this way, the phenomenon of vehicle acceleration response delay (lack of acceleration torque) may occur. However, in order to prevent the phenomenon of acceleration response delay from occurring, rear-wheel torque compensation is performed using the rear-wheel motor 41 that still has room up to the upper torque limit. That is, the controller 20 performs torque compensation for the rear-wheel torque command while the change rate of the front-wheel torque command is limited.

Here, the controller 20 calculates a backlash estimation value of the drive system in which the zero-crossing occurs, determines a torque correction amount based based on the calculated backlash estimation value, and then, compensates for the torque command of the drive system in which the zero-crossing does not occur using the determined torque correction amount.

That is, in the example of FIG. 9, the backlash estimation value of the front-wheel drive system in which the zero-crossing occurs is calculated and the torque correction amount is determined based on the calculated backlash estimation value, and then, the rear-wheel torque command that does not cause zero-crossing is compensated for using the determined torque correction amount.

Accordingly, even in a case where the zero-crossing of the front-wheel torque command occurs, since the torque compensation for the rear-wheel torque command is performed, it is possible to prevent the vehicle's acceleration responsiveness from decreasing.

In a case where the additional accelerator position sensor value is input more rapidly or the torque margin up to the torque upper limit of the rear-wheel motor 41 is smaller, the compensation for the rear-wheel torque is made only in an area that is equal to or lower than the torque upper limit of the rear-wheel motor 41.

To this end, the controller 20 may determine the minimum value among the rear-wheel torque command compensated for using the above torque correction amount and the torque upper limit value of the rear-wheel motor 41 as the rear-wheel torque command.

Then, when the front-wheel torque command has completely passed the backlash band and the same-direction distribution in the acceleration direction is being performed, the front-wheel torque command and the rear-wheel torque command are determined through the normal front and rear-wheel torque distribution process of distributing the required torque according to the front and rear-wheel distribution ratio, so that the sum of the front-wheel torque command and the rear-wheel torque command follows the required torque.

Thereafter, the accelerator position sensor value decreases (accelerator-on), and at a time-point (C), the required torque corresponding to the accelerator position sensor value (=sum torque command, total torque command) becomes equal to or lower than the preset mode switching threshold ("required torque≤mode switching threshold").

Accordingly, according to the above-described mode switching method, the torque control mode of the vehicle is switched from mode 3, which is the same-direction distribution mode in the acceleration direction, to mode 1, which is the reverse-direction distribution mode in the acceleration direction.

Then, when the accelerator is released (the accelerator position sensor value becomes 0), the mode is switched from the mode 1, which is the reverse-direction distribution mode in the acceleration direction, to the mode 2, which is the reverse-direction distribution mode in the regenerative direction. The example of FIG. 9 shows a case where the accelerator position sensor value and the corresponding required torque continue to decrease, and the front-wheel torque command is switched from the reverse-direction distribution mode in the acceleration direction (mode 1) to the reverse-direction distribution mode in the regenerative direction (mode 2) before passing through the backlash band.

As described above, while the accelerator position sensor value decreases, only the front-wheel torque command must pass through the zero-crossing and the backlash band, and to this end, the controller 20 performs correction control (backlash control) for limiting the torque change rate for the front-wheel torque command.

That is, when the front-wheel torque command causes zero-crossing, the backlash control is performed to limit the change rate (gradient) of the front-wheel torque command so that the front-wheel torque command does not decrease rapidly, and the controller 20 determines the front-wheel torque command to be a value that smoothly changes along the maximum allowable change rate.

In this way, the phenomenon of vehicle deceleration response delay (deceleration delay phenomenon due to excessive torque) may occur during the backlash control for limiting the change rate of the front-wheel torque command, but the torque compensation for the rear-wheel torque command may be performed during the change rate of the front-wheel torque command limit, so that the deceleration response delay may be resolved using the rear-wheel motor 41.

Here, the controller 20 calculates a backlash estimation value of the drive system in which the zero-crossing occurs, determines a torque correction amount based on the calculated backlash estimation value, and then, compensates for the torque command of the drive system in which the zero-crossing does not occur using the determined torque correction amount.

That is, in the example of FIG. 9, the backlash estimation value of the front-wheel drive system in which the zero-crossing occurs is calculated, the torque correction amount is determined based on the calculated backlash estimation value, and then, the rear-wheel torque command that does not cause zero-crossing is compensated for using the determined torque correction amount.

However, since the rear-wheel torque command is limited to the rear-wheel minimum torque threshold having a positive (+) value, the rear-wheel torque command cannot be compensated to a value smaller than the rear-wheel minimum torque threshold during the compensation process, and in this case, the rear-wheel torque command is determined as the rear-wheel minimum torque threshold.

Here, since additional compensation of the rear-wheel torque command for resolving the deceleration response delay is not possible, braking hydraulic pressure corresponding to a torque correction amount that is additionally necessary with reference to the rear-wheel minimum torque threshold is generated, thereby generating friction braking torque necessary for compensation. Thus, it is possible to solve the problem of the deceleration response delay.

That is, in a state where the rear-wheel torque command is limited to the rear-wheel minimum torque threshold, the insufficient deceleration torque is compensated for by the friction braking torque while the change rate of the front-wheel torque command is limited.

During this deceleration torque compensation, a torque value that is the sum of the front-wheel torque command with the limited change rate, the rear-wheel torque command determined by the rear-wheel minimum torque threshold, and the friction braking torque command follows the required torque. Here, the friction braking torque command is determined as a value obtained by subtracting the front-wheel torque command with the limited change rate and the rear-wheel minimum torque threshold from the required torque.

Accordingly, the controller 20 controls the operations of the front-wheel motor 31 and the rear-wheel motor 41 according to the front-wheel torque command and the rear-wheel torque command, and at the same time, generates the braking hydraulic pressure according to the friction braking torque command to control the operation of the friction brake 50, thereby generating the torque necessary in the vehicle.

Referring to FIG. 9, it can be seen that after the time-point (C), the rear-wheel torque command is determined as the rear-wheel minimum torque threshold, and the torque change rate limit of the front-wheel torque command is performed during the zero-crossing of the front-wheel torque command.

In addition, during the torque change rate control, the braking hydraulic pressure is generated to generate the friction braking torque to thus compensate for the insufficient deceleration torque, and then, after the front-wheel torque command passes through the backlash band, the braking hydraulic pressure and the friction braking torque are reduced, and the required torque is satisfied by the sum of the front-wheel torque command and the rear-wheel torque command.

After the front-wheel torque command passes through the backlash band and the accelerator is off, the vehicle's torque control mode is switched to "mode 2", which is the reverse-direction distribution mode in the regenerative direction. Therefore, in the mode 2, the rear-wheel torque command is maintained and limited to the rear-wheel minimum torque threshold, which is a positive (+) value, and the front-wheel torque command is compensated for by the torque limit amount according to the rear-wheel torque limit.

Here, the front-wheel torque command is determined as a value obtained by subtracting the rear-wheel torque command from the required torque, and the sum of the front-wheel torque command and the rear-wheel torque command constantly satisfies the value of the required torque.

Referring to the vehicle acceleration graph shown at the bottom of FIG. 9, it can be seen that there is no acceleration delay or deceleration delay of the vehicle even though the front-wheel torque command causes zero-crossing and passes through the backlash band at the points in time (B) and (C).

At a time-point (D), the driver depresses the brake, and the required torque is switched to a deceleration torque, which is a negative torque, and according to the above-described mode switching method, the torque control mode of the vehicle is switched from mode 2, which is the reverse-direction distribution mode in the regenerative direction, to mode 4, which is the same-direction distribution mode in the regenerative direction.

Here, since the torque control mode is switched from the reverse-direction distribution mode to the same-direction distribution mode for regeneration, the rear-wheel torque command, which maintains a positive (+) value, must decrease to a negative (−) value after passing through the backlash band while causing zero-crossing.

In this way, while the rear-wheel torque command passes through the backlash band, the backlash control for limiting the change rate of the rear-wheel torque command is performed by the controller 20, similar to the change rate (gradient) limit for the front-wheel torque command. During the backlash control, the change rate of the rear-wheel torque command is controlled to the maximum allowable change rate, which is set to a small value that does not cause backlash shock.

Additionally, the zero-crossing and backlash band passage of the rear-wheel torque command may result in a vehicle deceleration response delay (excessive torque), and the front-wheel torque command is reduced to compensate for this deceleration response delay. Here, the reduction of the front-wheel torque command means changing the front-wheel torque command in a direction in which the absolute value of the front-wheel torque command, which has a negative (−) value, increases.

In order to compensate for the deceleration response delay as described above, while the change rate of the rear-wheel torque command limit is performed, the controller 20 calculates a backlash estimation value of the drive system in which the zero-crossing occurs, determines a torque correction amount based on the calculated backlash estimation value, and then compensates for the torque command of the drive system in which the zero-crossing does not occur using the determined torque correction amount.

That is, in the example of FIG. 9, the backlash estimation value of the rear-wheel drive system in which the zero-crossing occurs is calculated and the torque correction amount is determined based on the calculated backlash estimation value, and then, the front-wheel torque command that does not cause zero-crossing is compensated using the determined torque correction amount.

However, in a case where the torque correction amount necessary to satisfy the required torque is not fully satisfied by the torque of the front-wheel motor 31 since there is not enough room for the lower torque limit of the front-wheel torque command, the controller 20 allows the friction braking torque to meet the remaining compensation amount.

That is, in a case where a value obtained by subtracting the rear-wheel torque command (negative value) from the required torque is smaller than a preset lower torque limit (negative value) of the front-wheel motor 31, in order to compensate for the insufficient torque in the required torque during the change rate control of the rear-wheel torque command, the compensation is partially made by the front-wheel torque up to the lower torque limit of the front-wheel motor 31, and the remainder is compensated for by the friction braking torque by generating braking hydraulic pressure.

To this end, the front-wheel torque command compensated for using the torque correction amount and the lower torque limit value of the front-wheel motor 31 may be compared, and the maximum value among the two values is determined as the front-wheel torque command.

That is, since both of the two compared values are negative (−) values, the value whose absolute value is smaller among the compensated front-wheel torque command and the lower torque limit value of the front-wheel motor 31 is determined as the front-wheel torque command.

In a case where the front-wheel torque command compensated for using the torque correction amount is smaller than the lower torque limit of the front-wheel motor 31, and the front-wheel torque command is determined as the torque lower limit, the controller 20 supplements the insufficient deceleration torque by the friction braking torque. Here, the friction braking torque command may be determined as a torque value obtained by subtracting the rear-wheel torque command with change rate limit and the front-wheel torque command (torque lower limit) from the required torque.

In a case where the friction braking torque command is determined in this way, the operation of the front-wheel motor 31 is controlled according to the front-wheel torque command, and the operation of the rear-wheel motor 41 is controlled according to the rear-wheel torque command, by the controller 20. At the same time, the operation of the friction brake 50 is controlled to generate the necessary braking hydraulic pressure and friction braking torque according to the determined friction braking torque command, so that complete torque compensation capable of satisfying the required torque can be achieved.

After the rear-wheel torque command has completely passed through the backlash band, while the same-direction distribution in the regenerative direction is being performed, the front-wheel torque command and the rear-wheel torque command are determined through the normal front and rear-wheel torque distribution process of distributing the required torque according to the front and rear-wheel distribution ratio, and the required torque is followed by the sum of the front-wheel torque command and the rear-wheel torque command.

In a case where the required torque is not satisfied by the sum of the front-wheel torque command and the rear-wheel torque command due to the lower torque limit of the front-wheel motor 31 or the rear-wheel motor 41, the necessary remaining braking torque is satisfied by generating friction braking torque. Here, the sum of the rear-wheel torque command (regenerative torque command), the front-wheel torque command (regenerative torque command), and the friction braking torque command follows the required torque.

At a time-point (E), the driver releases the brake, and the torque control mode is switched from "mode 4", which is the same-direction distribution in the regenerative direction, to "mode 2", which is the reverse-direction distribution in the regenerative direction, by the above-described mode switching method.

Here, the rear-wheel torque command, which maintains a negative (−) torque, increases again to the rear-wheel minimum torque threshold, which is a positive (+) torque value. To this end, the rear-wheel torque command must pass through the backlash band while causing zero-crossing.

After the time-point (E), while the rear-wheel torque command passes through the backlash band while causing the zero-crossing, the controller 20 performs the backlash control for limiting the change rate of the rear-wheel torque command, and during the backlash control, the change rate of the rear-wheel torque command is controlled to the maximum allowable change rate set to a small value that does not cause backlash shock.

Further, the zero-crossing and the backlash band passage of the rear-wheel torque command may result in a vehicle deceleration response delay (excessive torque), and the front-wheel torque command is increased to compensate for this deceleration response delay.

Here, the increase of the front-wheel torque command means changing the front-wheel torque command in a direction in which the absolute value of the front-wheel torque command, which has a negative (−) value, decreases.

In the process of compensating for the deceleration response delay as described above, the controller 20 calculates a backlash estimation value of the drive system in which the zero-crossing occurs, determines a torque correction amount based on the calculated backlash estimation value, and then, compensates the torque command of the drive system in which the zero-crossing does not occur using the determined torque correction amount.

That is, in the example of FIG. 9, the backlash estimation value of the rear-wheel drive system in which the zero-crossing occurs is calculated, the torque correction amount is determined based on the calculated backlash estimation value, and then, the front-wheel torque command that does not cause zero-cross is compensated using the determined torque correction amount.

Hereinabove, the examples of the mode switching and the torque control based on the time-points (D) and (E) have been described with reference to FIG. 9, and it can be seen that no vehicle response delay occurs despite the zero-crossing and backlash band passage of the rear-wheel torque command at the time-points (D) and (E), as shown in the vehicle acceleration graph shown at the bottom of FIG. 9.

Figure 10:
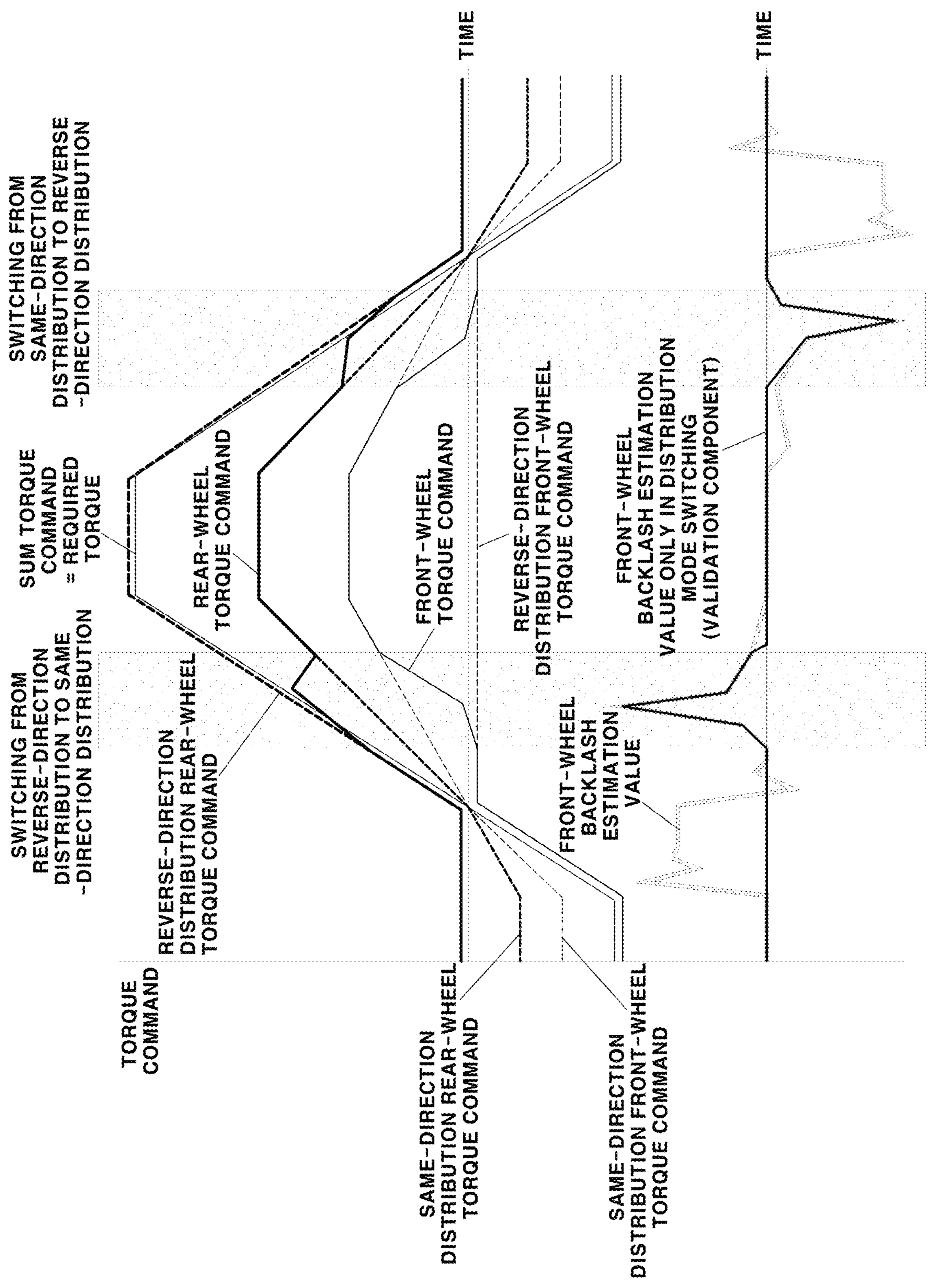
FIG. 10 is a drawing illustrating a front-wheel torque command, a rear-wheel torque command, and a backlash estimation value for each torque distribution mode according to an embodiment of the present disclosure.

FIG. 10 is a drawing illustrating a front-wheel torque command, a rear-wheel torque command, and a backlash estimation value for each torque distribution mode according to the present disclosure. In FIG. 10, the sum torque command refers to a command of the sum of torque values of the front-wheel torque command and the rear-wheel torque command, and the torque value of the sum torque command corresponds to a required torque value before front and rear-wheel torque distribution.

FIG. 10 illustrates an example in which the direction of the required torque for vehicle driving changes from a negative (−) torque direction (vehicle deceleration direction) to a positive (+) torque direction (vehicle acceleration direction), and then, changes to the negative (−) torque direction (vehicle deceleration direction).

The "same-direction distribution front-wheel torque command" and the "same-direction distribution rear-wheel torque command" indicated by dashed lines in FIG. 10 correspond to the front-wheel torque command and the rear-wheel torque command as a distribution result of the required torque (sum torque command) according to the drive system torque control mode, i.e., the same-direction distribution mode, as described with reference to FIG. 3, in the entire range of the required torque.

In the same-direction distribution mode, in a case where there is a request for a change in direction of the required torque, the directions of the front-wheel torque command and the rear-wheel torque command are also changed simultaneously. During this direction change, each torque command causes zero-crossing while passing through the backlash band.

In addition, the "reverse-direction distribution front-wheel torque command" and the "reverse-direction distribution rear-wheel torque command" indicated by dashed lines in FIG. 10 correspond to the front-wheel torque command and the rear-wheel torque command as a distribution result of the required torque (sum torque command) according to the drive system torque control mode, i.e., the reverse-direction distribution mode, as described with reference to FIG. 4, in the entire range of the required torque.

In the reverse-direction distribution mode, even in a case where the direction of the required torque changes, the rear-wheel torque command maintains a torque in the positive (+) direction, which is the motor driving direction, while the required torque changes. In particular, even in a case where the required torque is a torque in the vehicle deceleration direction, i.e., a torque in the negative (−) direction, the rear-wheel torque command is determined as the rear-wheel minimum torque threshold, which is a positive (+) direction torque value, without direction change.

In the case of the front-wheel torque command, even in a case where the direction of the required torque changes, the torque maintains a torque in the negative (−) direction, which is the motor regeneration direction, while the required torque changes. In particular, even in a case where the required torque is a torque in the vehicle acceleration direction, i.e., a torque in the positive (+) direction, the front-wheel torque command is determined as the front-wheel maximum torque threshold, which is a negative (−) direction torque value, without direction change.

In the present disclosure, during switching between the same-direction distribution mode and the reverse-direction distribution mode, i.e., during the distribution mode switching, when one of the front-wheel torque command and the rear-wheel torque command causes zero-crossing, torque correction of the other one that does not cause zero-crossing is performed.

FIG. 10 shows an example in which zero-crossing does not occur in the rear-wheel torque command but occurs in the front-wheel torque command. Further, in the example of FIG. 10, switching between the same-direction distribution mode and the reverse-direction distribution mode is performed when the required torque is a torque in the positive (+) direction torque, which is the vehicle acceleration direction.

That is, in the example of FIG. 10, switching from the reverse-direction distribution mode to the same-direction distribution mode ("switching from reverse-direction distribution to same-direction distribution") is performed first while the required torque increases linearly, and then, switching from the same-direction distribution mode to the reverse-direction distribution mode ("switching from same-direction distribution to reverse-direction distribution") is performed while the required torque decreases linearly.

The "front-wheel torque command" and the "rear-wheel torque command" shown by solid lines in FIG. 10 correspond to the torque commands distributed from the required torque according to the present disclosure. According to the exemplified front-wheel torque command and rear-wheel torque command, it can be seen that, during distribution mode switching, the change rate of the front-wheel torque command is limited to reduce backlash shock and torque correction of the rear-wheel torque command is performed.

Referring to the example of FIG. 10 in more detail, in a case where the required torque (torque of the sum torque command) is in a torque band in the negative (−) direction of the vehicle deceleration direction, the mode is controlled to the reverse-direction distribution mode in the regenerative direction.

In the reverse-direction distribution mode in the regenerative direction, the rear-wheel torque command is determined as the rear-wheel minimum torque threshold, which is a positive (+) torque value, and the front-wheel torque command is determined as the torque in the negative (−) direction, which is the motor regenerative direction.

Then, in a case where the direction of the required torque is changed and the required torque becomes the torque in the positive (+) direction in the vehicle acceleration direction, the distribution mode is switched from the regenerative direction to the reverse-direction distribution mode in the acceleration direction. In the reverse-direction distribution mode in the acceleration direction, the front-wheel torque command is determined as the front-wheel maximum torque threshold, which is a negative (−) torque value, and the rear-wheel torque command is determined as the torque in the positive (+) direction, which is the motor driving direction.

Then, as the required torque increases, the torque distribution mode is switched from the reverse-direction distribution mode in the acceleration direction to the same-direction distribution mode in the acceleration direction, and during the distribution mode switching, the front-wheel torque command causes zero-crossing while passing through the backlash band.

In addition, the backlash estimation value is calculated for the front-wheel drive system passing through the backlash band during the distribution mode switching, and the backlash estimation value calculated during the distribution mode switching may be used as a valid value to correct the rear-wheel torque command.

More specifically, during the distribution mode switching, when the front-wheel torque command causes the zero-crossing, the change rate (gradient) of the front-wheel torque command is limited to a predetermined change rate in order to reduce backlash shock, and at the same time, the backlash estimation value in the front-wheel drive system is calculated, and then, the torque correction amount for correcting the rear-wheel torque command is calculated based on the calculated backlash estimation value in the front-wheel drive system.

Further, during the distribution mode switching, torque correction is performed for the rear-wheel torque command to compensate for a raw torque command distributed from the required torque using the torque correction amount determined based on the backlash estimation value of the front-wheel drive system.

Then, the required torque decreases in the same-direction distribution mode in the acceleration direction and switches to the reverse-direction distribution mode in the acceleration direction. During the distribution mode switching, the front-wheel torque command causes zero-crossing while passing through the backlash band.

During the switching to the reverse-direction distribution mode, similarly, the backlash estimation value is calculated for the front-wheel drive system passing through the backlash band, and the backlash estimation value calculated during the distribution mode switching may be used as a valid value to correct the rear-wheel torque command.

More specifically, during the switching to the reverse-direction distribution mode, when the front-wheel torque command causes the zero-crossing, the change rate (gradient) of the front-wheel torque command is limited to a predetermined change rate to reduce backlash shock, and at the same time, the backlash estimation value in the front-wheel drive system is calculated, and then, the torque correction amount for compensating for the rear-wheel torque command is calculated based on the calculated backlash estimation value of the front-wheel drive system.

Further, during the switching to the reverse-direction distribution mode, torque correction is performed to compensate for the raw torque command distributed from the required torque for the rear-wheel torque command using the torque correction amount determined based on the backlash estimation value of the front-wheel drive system.

After the distribution mode switching is completed, in the reverse-direction distribution mode in the acceleration direction, the front-wheel torque command is determined as the front-wheel maximum torque threshold, and then, the direction of the required torque is changed so that the required torque becomes a torque in the negative (−) direction in the vehicle deceleration direction, so that the mode is switched from the acceleration direction to the regenerative direction.

In the reverse-direction distribution mode in the regenerative direction, the rear-wheel torque command is determined as the rear-wheel minimum torque threshold, which is a positive (+) torque value, and the front-wheel torque command is determined as the torque in the negative (−) direction, which is the motor regenerative direction.

At the bottom shown in FIG. 10, the backlash speed is exemplified as the backlash estimation value calculated for the front-wheel drive system, and the calculated backlash estimation value is valid only during the switching from the reverse-direction distribution mode to the same-direction distribution mode ("switching from reverse-direction distribution to same-direction distribution").

Accordingly, in compensating for the rear-wheel torque command is performed only during the distribution mode switching, the torque correction amount is determined based on the calculated backlash estimation value, and then, the torque correction is performed to compensate for the rear-wheel torque command using the determined torque correction amount.

Hereinbefore, the torque control system of the drive system of the electric vehicle and the method therefor according to the embodiment of the present disclosure have been described in detail. According to the above-described present disclosure, by applying a method of sequentially switching directions of front-wheel torque and rear-wheel torque, it is possible to alleviate backlash of a drive system in an electric vehicle, and reduce backlash vibration, to thereby improve drivability of the vehicle.

In addition, according to the present disclosure, since the backlash shock problem is solved, it is possible to improve acceleration/deceleration responsiveness and longitudinal driving performance of the vehicle.

In particular, in the present disclosure, a backlash estimation value is calculated while one of the front-wheel torque command and the rear-wheel torque command passes through a corresponding drive system backlash band, a torque correction amount is determined based on the calculated backlash estimation value, and the other torque command is compensated using the determined torque correction amount. Accordingly, it is possible to compensate for a vehicle acceleration discontinuity that occurs while one of the torque commands passes through the backlash band using a drive system torque that does not pass through the backlash band.

Thus, it is possible to significantly resolve the discontinuity and shock in vehicle acceleration, two-stage acceleration/deceleration sensation, etc.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A torque control system for a drive system of an electric vehicle comprising:

a controller that generates a front-wheel torque command and a rear-wheel torque command having torque values distributed from required torque for vehicle driving, according to a torque distribution mode selected based on vehicle driving information among a plurality of set torque distribution modes;

a front-wheel motor controlled according to the front-wheel torque command generated and output by the controller; and a rear-wheel motor controlled according to the rear-wheel torque command generated and output by the controller;

wherein the controller is configured to:

determine whether a switching between the plurality of torque distribution modes occurs;

calculate, during the switching between the plurality of torque distribution modes, a torque correction amount for reducing backlash shock based on a backlash estimation value in the drive system of a first torque command that causes zero-crossing among the front-wheel torque command and the rear-wheel torque command; and perform torque correction using the calculated torque correction amount for a second torque command that does not cause the zero-crossing.

2. The torque control system according to claim 1, wherein the plurality of torque distribution modes comprise:

a same-direction distribution mode in which the front-wheel torque command and the rear-wheel torque command are determined as torque values in a same direction among a motor regeneration direction and a motor driving direction; and a reverse-direction distribution mode in which the front-wheel torque command and the rear-wheel torque command are determined as torque values in different directions among the motor regeneration direction and the motor driving direction.

3. The torque control system according to claim 1, wherein the controller is configured to select a torque distribution mode corresponding to a current vehicle driving state based on an accelerator operation state, a brake operation state, and the required torque, as the vehicle driving information, among the plurality of torque distribution modes.

4. The torque control system according to claim 1, wherein the backlash estimation value corresponds to one or both of a backlash speed estimation value of the drive system at which the torque command causes the zero-crossing and a backlash acceleration estimation value of the drive system at which the torque command causes the zero-crossing.

5. The torque control system according to claim 1, wherein the controller is configured to determine the torque correction amount as a value obtained by applying one or more of a weight, a filter, a change rate limit, and a dead zone to the backlash estimation value.

6. The torque control system according to claim 5, wherein the controller is configured to adjust the weight, a time constant or gain of the filter, a change rate limit value for the change rate limit, and the dead zone applied to the backlash estimation value according to at least one of the required torque, a current torque estimation value, an accelerator position sensor value, a vehicle speed, or a motor speed.

7. A torque control method for a drive system of an electric vehicle comprising:

determining, by a controller, a front-wheel torque command and a rear-wheel torque command having torque values distributed from required torque for vehicle driving, according to a torque distribution mode selected based on vehicle driving information among a plurality of set torque distribution modes;

determining whether a switching between the plurality of torque distribution modes occurs;

determining, during the switching between the plurality of torque distribution modes, a backlash estimation value for the drive system of a torque command that causes zero-crossing among the front-wheel torque command and the rear-wheel torque command, by the controller;

calculating a torque correction amount for reducing backlash shock based on the determined backlash estimation value, by the controller; and performing torque correction using the calculated torque correction amount for the other torque command that does not cause the zero-crossing among the front-wheel torque command and rear-wheel torque command, by the controller.

8. The method according to claim 7, wherein the plurality of torque distribution modes comprise:

a same-direction distribution mode in which the front-wheel torque command and the rear-wheel torque command are determined as torque values in a same direction among a motor regeneration direction and a motor driving direction; and a reverse-direction distribution mode in which the front-wheel torque command and the rear-wheel torque command are determined as torque values in different directions among the motor regeneration direction and the motor driving direction.

9. The method according to claim 7, wherein the controller selects a torque distribution mode corresponding to a current vehicle driving state based on an accelerator operation state, a brake operation state, and the request torque, as the vehicle driving information, among the plurality of torque distribution modes.

10. The method according to claim 7, wherein the backlash estimation value corresponds to one or both of a backlash speed estimation value of the drive system at which the torque command causes the zero-crossing and a backlash acceleration estimation value of the drive system at which the torque command causes the zero-crossing.

11. The method according to claim 7, wherein the controller determines the torque correction amount as a value obtained by selectively applying one or more of a weight, a filter, a change rate limit, and a dead zone to the backlash estimation value.

12. The method according to claim 11, wherein the controller adjusts the weight, a time constant or gain of the filter, a change rate limit value for the change rate limit, and the dead zone applied to the backlash estimation value according to at least one of the required torque, a current torque estimation value, an accelerator position sensor value, a vehicle speed, or a motor speed.

13. A torque control system for a drive system of an electric vehicle comprising:

a controller that generates a front wheel torque command and a rear wheel torque command having torque values distributed from required torque for vehicle driving, according to a torque distribution mode selected based on vehicle driving information among a plurality of set torque distribution modes;

a front wheel motor control led according to the front wheel torque command generated and output by the controller; and a rear wheel motor controlled according to the rear wheel torque command generated and output by the controller;

wherein the controller is configured to:

determine whether a switching between the plurality of torque distribution modes occurs;

calculate, during the switching between the plurality of torque distribution modes, a torque correction amount for reducing backlash shock based on a backlash estimation value in the drive system of a first torque command that causes zero crossing among the front wheel torque command and the rear wheel torque command; and perform torque correction using the calculated torque correction amount for a second torque command that does not cause the zero crossing;

wherein the torque distribution mode includes a reverse direction distribution mode in which torque in reverse directions is distributed to the front and rear wheels, in addition to a same direction distribution mode in which torque in a same direction is distributed to the front and rear wheels; and wherein the controller is configured to perform switching between the same direction distribution mode and the reverse direction distribution mode.

* * * * *